(12) United States Patent
Goto et al.

(10) Patent No.: US 7,265,852 B2
(45) Date of Patent: Sep. 4, 2007

(54) IMAGE FORMING APPARATUS, POWER CONSUMPTION RESTRICTION SYSTEM, POWER CONSUMPTION RESTRICTION PROGRAM, AND POWER CONSUMPTION RESTRICTION METHOD

(75) Inventors: Jiro Goto, Aichi-Ken (JP); Katsuhisa Toyama, Toyokawa (JP); Kaoru Tada, Aichi-Ken (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 944 days.

(21) Appl. No.: 10/108,353

(22) Filed: Mar. 29, 2002

(65) Prior Publication Data

US 2002/0140964 A1 Oct. 3, 2002

(30) Foreign Application Priority Data

Mar. 30, 2001 (JP) .............................. 2001-102622

(51) Int. Cl.
*G06F 15/00* (2006.01)
(52) U.S. Cl. ...................... 358/1.14; 358/1.9; 713/310; 713/320
(58) Field of Classification Search ............... 358/1.14, 358/1.9; 713/310, 320
See application file for complete search history.

(56) References Cited

U.S. PATENT DOCUMENTS

| | | | |
|---|---|---|---|
| 4,075,699 A * | 2/1978 | Schneider et al. | 700/291 |
| 5,317,366 A * | 5/1994 | Koshi et al. | 399/1 |
| 5,751,575 A * | 5/1998 | Hirosawa et al. | 700/83 |
| 5,995,729 A * | 11/1999 | Hirosawa et al. | 703/1 |
| 6,018,690 A * | 1/2000 | Saito et al. | 700/295 |
| 6,118,334 A * | 9/2000 | Tanaka et al. | 327/565 |
| 6,347,202 B1 * | 2/2002 | Shishizuka et al. | 399/75 |
| 6,429,642 B1 * | 8/2002 | Rodilla Sala | 324/142 |
| 6,509,975 B1 * | 1/2003 | Motegi | 358/1.14 |
| 6,526,516 B1 * | 2/2003 | Ishikawa et al. | 713/340 |
| 6,724,493 B1 * | 4/2004 | Maruta et al. | 358/1.14 |
| 6,785,012 B2 * | 8/2004 | Okazawa | 358/1.14 |

FOREIGN PATENT DOCUMENTS

| | | |
|---|---|---|
| JP | 06-202401 | 7/1994 |
| JP | 09-160448 | 6/1997 |
| JP | 10-224530 | 8/1998 |
| JP | 11-024517 | 1/1999 |
| JP | 11-174900 | 7/1999 |
| JP | 2000-056869 | 2/2000 |

* cited by examiner

*Primary Examiner*—Twyler Lamb
*Assistant Examiner*—Mark R. Milia
(74) *Attorney, Agent, or Firm*—Buchanan Ingersoll & Rooney PC

(57) ABSTRACT

A plurality of image forming apparatuses connected with one another via a network each have a power management table A and a power management table B. Each image forming apparatus uses the power management table A to cumulate power amounts consumed therein by each user group, transmits cumulating results (the contents of the management table A) to other image forming apparatuses. The image forming apparatus receives the contents of the power management table A from the other image forming apparatuses, obtains a sum of consumption power amounts of each user group, using the received contents and the contents of its own power management table A, and updates relevant fields in the power management table B. The image forming apparatus prohibits execution of a new job submitted by a group whose consumption power amount is equal to or greater than a maximum power amount.

16 Claims, 15 Drawing Sheets

FIG. 5A

| GROUP NO. | MAXIMUM POWER | MAXIMUM POWER AMOUNT | CONSUMPTION POWER | CONSUMPTION POWER AMOUNT |
|---|---|---|---|---|
| 0 | 0W | 0kWh | 100W | 2kWh |
| 1 | 400W | 5kWh | 400W | 6kWh |
| 2 | 700W | 10kWh | 700W | 8kWh |
| 3 | 400W | 0kWh | 0W | 4kWh |
| ⋮ | ⋮ | ⋮ | ⋮ | ⋮ |
| SUM | 3,500W | 100kWh | 2,000W | 45kWh |

FIG. 5B

| GROUP NO. | MAXIMUM POWER AMOUNT | CONSUMPTION POWER AMOUNT | JUDGMENT RESULT |
|---|---|---|---|
| 0 | 0kWh | 2kWh | OK |
| 1 | 5kWh | 6kWh | OK |
| 2 | 10kWh | 8kWh | OK |
| 3 | 0kWh | 4kWh | OK |
| ⋮ | ⋮ | ⋮ | ⋮ |
| SUM | 100kWh | 45kWh | OK |

FIG. 5C

| GROUP NO. | MAXIMUM POWER | CONSUMPTION POWER | JUDGMENT RESULT |
|---|---|---|---|
| 0 | 0W | 100W | OK |
| 1 | 400W | 400W | OK |
| 2 | 700W | 700W | OK |
| 3 | 400W | 0W | OK |
| ⋮ | ⋮ | ⋮ | ⋮ |
| SUM | 3,500W | 2,000W | OK |

GROUP POWER MANAGEMENT SET/MEASURED VALUE

| GROUP NO. | MAXIMUM POWER | MAXIMUM POWER AMOUNT | CONSUMPTION POWER | CONSUMPTION POWER |
|---|---|---|---|---|
| 0 | 0W | 0kWh | 100W | 2kWh |
| 1 | 400W | 5kWh | 400W | 6kWh |
| 2 | 700W | 10kWh | 700W | 8kWh |
| 3 | 400W | 0kWh | 700W | 4kWh |
| ... | ... | ... | ... | ... |
| SUM | 3,500W | 100kWh | 2,000W | 45kWh |

GROUP POWER MANAGEMENT SET/MEASURED VALUE

| GROUP NO. | MAXIMUM POWER | MAXIMUM POWER AMOUNT | CONSUMPTION POWER | CONSUMPTION POWER AMOUNT |
|---|---|---|---|---|
| 0 | ¥0 | ¥0 | ¥0 | ¥30 |
| 1 | ¥624 | ¥70 | ¥624 | ¥90 |
| 2 | ¥1,092 | ¥150 | ¥1,092 | ¥120 |
| 3 | ¥624 | ¥0 | ¥1,092 | ¥60 |
| ... | ... | ... | ... | ... |
| SUM | ¥5,640 | ¥1,500 | ¥3,120 | ¥675 |

810 — ¥ ↔ Wh

820 — OK

IMAGE FORMING APPARATUS, POWER CONSUMPTION RESTRICTION SYSTEM, POWER CONSUMPTION RESTRICTION PROGRAM, AND POWER CONSUMPTION RESTRICTION METHOD

This application is based on Patent Application No. 2001-102622 filed in Japan, the content of which is hereby incorporated by reference.

BACKGROUND OF THE INVENTION (1) Field of the Invention

The present invention relates to an image forming apparatus such as a copier and a printer, a power consumption restriction system for the image forming apparatus, and a power consumption restriction program and a power consumption restriction method that are executed by the image forming apparatus. The present invention in particular relates to energy-saving technology.

(2) Related Art

In recent years, the problem of environmental destruction has raised discussions about energy-saving measures in various fields. The field of image forming apparatuses such as copiers and printers is not an exception, and therefore, efforts are being made to reduce power consumption by providing image forming apparatuses with various functions. Representative examples of such functions are "preheat function" and "automatic power-off function". With the preheat function, power supply to such a unit that has relatively high power consumption in a copier, such as a fixing unit, is reduced when a certain time period passes after the copier stops being operated. With the automatic power-off function, power supply of a copier is automatically cut off when a certain time period passes after the copier stops being operated.

At companies or the like, copiers are often shared by a plurality of departments. Some companies employ copy count management. In detail, the copy count management is realized by counting the number of copies made in every department, and charging each department with an expense that is set in proportion to its copy count.

The various functions of the copiers described above are effective energy-saving (power-saving) measures, because they can reduce power consumption while copiers are being idle. The copy count management described above is also an effective energy-saving measure, because it can eventually prevent unnecessary copies from being made regardless of users' intentions.

Also, power consumption of a copier may differ depending on a way of operating the copier. For example, when a plurality of documents are copied with the use of an Automatic Document Feeder (ADF), the total power consumption for copying the documents in a case where the documents are copied at a time (all the documents are stacked on the ADF at one time) is smaller than in a case where the documents are copied at several times, due to the difference in the copier's operating time per one document, etc. This indicates that power consumption can be reduced simply by correcting operational practices, without changing the contents of the copy operations.

The above-described copy count management, however, only involves the expense management in proportion to the copy count. This copy count management may motivate users to reduce the number of copies being made, but may not motivate users to correct the above-described operational practices for power-saving purposes.

SUMMARY OF THE INVENTION

The first objective of the present invention is to provide an image forming apparatus that can enhance users' awareness of energy-saving when sharing the image forming apparatus, and thereby further promote energy-saving measures.

The second objective of the present invention is to provide a power consumption restriction system that includes the image forming apparatus.

The third objective of the present invention is to provide a power consumption restriction program that is executed by the image forming apparatus.

The fourth objective of the present invention is to provide a power consumption restriction method that is executed by the image forming apparatus.

The first objective of the present invention can be fulfilled by an image forming apparatus that forms images by executing jobs submitted by users who belong to groups, including: a cumulating unit for cumulating, for each group, power amounts that have been consumed for executing jobs; and a restricting unit for restricting, when a cumulated consumption power amount for any of the groups exceeds a power amount allocated to the group, job execution by the group.

The first objective of the present invention can also be fulfilled by an image forming apparatus that forms images by executing jobs submitted by users who belong to groups, the image forming apparatus being connected to one or more homogeneous image forming apparatuses via a network, the image forming apparatus including: a cumulating unit for cumulating, for each group, power amounts that have been consumed in the image forming apparatus for executing jobs; a transmitting unit for transmitting a cumulated consumption power amount for each group to the one or more image forming apparatuses; a receiving unit for receiving a cumulated consumption power amount for each group transmitted from the one or more image forming apparatuses; a summing unit for summing up, for each group, power amounts that have been consumed in all the image forming apparatuses connected via the network for executing jobs, using the cumulated consumption power amount for each group obtained by the cumulating unit and the cumulated consumption power amount for each group received by the receiving unit; and a restricting unit for restricting, when a summed consumption power amount for any of the groups obtained by the summing unit exceeds a power amount allocated to the group, job execution by the group.

The second objective of the present invention can be fulfilled by a power consumption restriction system including one or more image forming apparatuses and a restricting apparatus that is connected in a communicable state to the one or more image forming apparatuses and that restricts power consumption of the one or more image forming apparatuses, wherein each of the one or more image forming apparatuses forms images by executing jobs submitted by users who belong to groups, and includes: a cumulating unit for cumulating, for each group, power amounts that have been consumed in the image forming apparatus for executing jobs; and a transmitting unit for transmitting a cumulated consumption power amount for each group to the restricting apparatus, and the restriction unit includes: a receiving unit for receiving the cumulated consumption power amount for each group transmitted from the one or more image forming apparatuses; a summing unit for summing up, for each group, power amounts that have been consumed in the one or more image forming apparatuses connected via the network for executing jobs, using the cumulated consumption power amount for each group received by the receiving unit; an obtaining unit for obtaining a power amount allocated to each group; and a restricting unit for restricting, when a summed consumption power amount for any of the groups obtained by the summing unit exceeds a power amount allocated to the group, job execution by the group.

The third objective of the present invention can be fulfilled by a power consumption restriction program that is executed by an image forming apparatus that forms images by executing jobs submitted by users who belong to groups, the power consumption restriction program including: a cumulating step of cumulating, for each group, power amounts that have been consumed for executing jobs; an obtaining step of obtaining a power amount allocated to each group; and a restricting step of restricting, when a cumulated consumption power amount for any of the groups exceeds a power amount allocated to the group, job execution by the group.

The third objective of the present invention can also be fulfilled by a power consumption restriction program that is executed by an image forming apparatus that forms images by executing jobs submitted by users who belong to groups, and that is connected to one or more image forming apparatuses via a network, the power consumption restriction program including: a cumulating step of cumulating, for each group, power amounts that have been consumed in the image forming apparatus for executing jobs; a transmitting step of transmitting a cumulated consumption power amount for each group obtained in the cumulating step, to the one or more image forming apparatuses; a receiving step of receiving a cumulated consumption power amount for each group transmitted from the one or more image forming apparatuses; a summing step of summing up, for each group, power amounts that have been consumed in all the image forming apparatuses connected via the network for executing jobs, using the cumulated consumption power for each group obtained in the cumulating step and the cumulated consumption power amount for each group received in the receiving step; an obtaining step of obtaining a power amount allocated to each group; and a restricting step of restricting, when a summed consumption power amount for any of the groups obtained in the summing step exceeds a power amount allocated to the group, job execution by the group.

The fourth objective of the present invention can be fulfilled by a power consumption restriction method that is executed by an image forming apparatus that forms images by executing jobs submitted by users who belong to groups, the power consumption restriction method including: a cumulating step of cumulating, for each group, power amounts that have been consumed for executing jobs; an obtaining step of obtaining a power amount allocated to each group; and a restricting step of restricting, when a cumulated consumption power amount for any of the groups exceeds a power amount allocated to the group, job execution by the group.

The fourth objective of the present invention can also be fulfilled by a power consumption restriction method that is executed by an image forming apparatus that forms images by executing jobs submitted by users who belong to groups, and that is connected to one or more image forming apparatuses via a network, the power consumption restriction method including: a cumulating step of cumulating, for each group, power amounts that have been consumed in the image forming apparatus for executing jobs; a transmitting step of transmitting a cumulated consumption power amount for each group obtained in the cumulating step, to the one or more image forming apparatuses; a receiving step of receiving a cumulated consumption power amount for each group transmitted from the one or more image forming apparatuses; a summing step of summing up, for each group, power amounts that have been consumed in all the image forming apparatuses connected via the network for executing jobs, using the cumulated consumption power amount for each group obtained in the cumulating step and the cumulated consumption power amount for each group received in the receiving step; an obtaining step of obtaining a power amount allocated to each group; and a restricting step of restricting, when a summed consumption power amount for any of the groups obtained in the summing step exceeds a power amount allocated to the group, job execution by the group.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIGS. 5A to 5C show the constructions of power management tables stored in a nonvolatile memory of the control unit;

FIG. 8 shows a group power management setting screen 800 displayed on an LCD touch panel 310 of the control panel 300;

FIG. 9 shows the group power management setting screen 800 in which an electric fee is displayed instead of consumption power etc.;

DESCRIPTION OF THE PREFERRED EMBODIMENT

Figure 1:
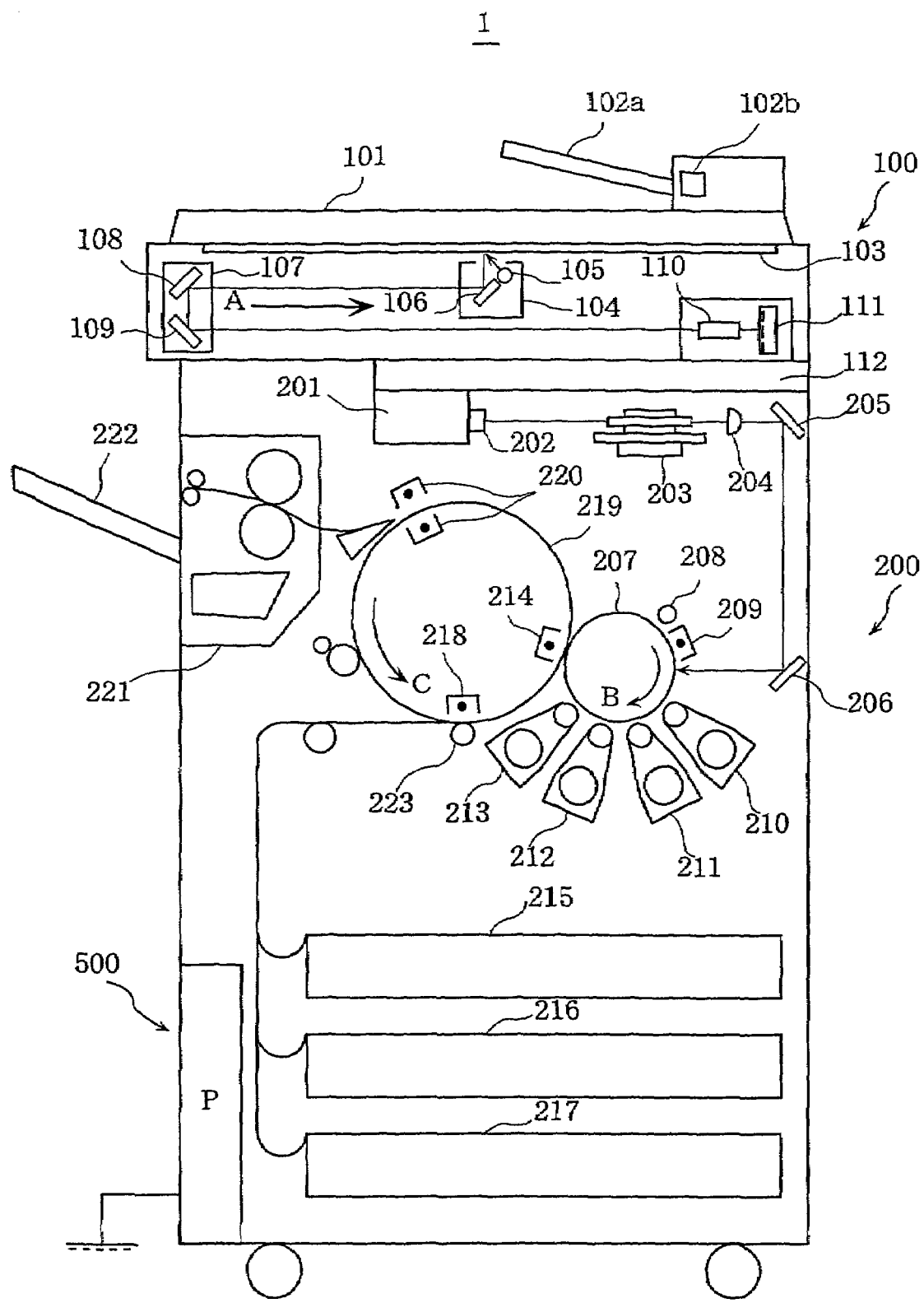
FIG. 1 shows the construction of a copier relating to an embodiment of the present invention.

The following describes a preferred embodiment of an image forming apparatus relating to the present invention, by taking a full-color copier for example (hereafter simply, a "copier"), with reference to the drawings.

1. Definitions

First, the following gives definitions of the terminology referred to in the present embodiment.

A plurality of copiers relating to the present embodiment (the number of copiers being represented by K) are used in combination with one another. These copiers are connected with one another via a network, and each copier has the homogeneous function relating to power management described hereafter in this specification. In the present embodiment, a subscript k (k=1, . . . , K) is used to identify the K copiers. The K copiers are shared by users in a plurality of groups (the number of groups being represented by N). The copiers relating to the present embodiment identify each group by group number (No.). A subscript n (n=1, . . . , N) is used to identify the N groups.

In the present embodiment, the term "power" intends to mean a value obtained by multiplying rated voltage by an electric current, the unit of which is watt (W). Also, the term "power amount" intends to mean a value obtained by time-integrating the power, the unit of which is watt-hour (Wh).

The maximum of power that can be used by all the groups is referred to as "overall maximum power", and is written as Pm. Also, the maximum of power that can be used by group n is referred to as "group n's maximum power", and is written as Pmn. A sum of peak values of power consumed in copiers for executing running jobs submitted by group n is referred to as "consumption power by group n", and is written as Pn. Also, a peak value of power consumed by copier k to execute a running job submitted by group n is referred to as "copier k's consumption power by group n" and is written as Pnk. The unit "W" is used for the "overall maximum power Pm", the "group n's maximum power Pmn", the "consumption power by group n Pn", and the "copier k's consumption power by group n Pnk".

A power amount allocated to group n is referred to as "group n's maximum power amount", and is written as Wmn. A sum of power amounts allocated to all the groups is referred to as "overall maximum power amount", and is written as Wm. A sum of power amounts consumed by the copiers connected via the network to execute jobs submitted by group n is referred to as "consumption power amount by group n", and is written as Wcn. A sum of power amounts consumed by copier k to execute jobs submitted by group n is referred to as "copier k's consumption power amount by group n", and is written as Wnk. Further, a sum of power amounts consumed by all the copiers connected via the network is referred to as "overall consumption power amount", and is written as Wc. The unit "Wh" is used for the "group n's maximum power amount Wmn", the "overall maximum power amount Wm", the "consumption power amount by group n Wcn", the "copier k's consumption power amount by group n Wnk", and the "overall consumption power amount Wc".

2. Construction of the Copier 2.1 Overall Construction

FIG. 1 shows the construction of a copier relating to a first embodiment of the present embodiment. The copier 1 is roughly composed of an image reader unit 100 and a printer unit 200. The image reader unit 100 reads image data of a document. The printer unit 200 forms an image on a recording sheet based on the image data of the document read by the image reader unit 100.

The image reader unit 100 includes an ADF (Automatic Document Feeder) 101, a scanner 104, and a signal processing unit 112. The ADF 101 includes a document tray 102a and a sensor 102b. When the sensor 102b detects documents stacked on the document tray 102a, the ADF 101 feeds the documents one at a time to a document glass 103. It should be noted here that a user of the copier may hold up the ADF 101 and manually place a document on the document glass 103.

In the scanner 104, an exposure lamp 105 illuminates a document that has been fed onto the document glass 103 by the ADF 101. A mirror 106 changes the optical path of light reflected from the document surface, so that the light enters a mirror box 107. Within the mirror box 107, mirrors 108 and 109 further change the optical path of the light, and a lens 110 directs the light so as to form an image on a three-line full-color CCD sensor 111. The CCD sensor 111 converts the reflected light from the document into analogue electric signals of R, G, and B. The analogue signals outputted from the CCD sensor 111 are inputted into the signal processing unit 112. It should be noted here that the scanner 104 is driven by a scan motor (not shown) in the direction indicated by arrow "A" (sub-scanning direction) at the speed "V", and scans the entire surface of the document. Also, along with the movement of the scanner 104, the mirror box 107 that contains the mirrors 108 and 109 is moved in the same direction indicated by arrow "A" at the speed "V/2".

The signal processing unit 112 subjects each of the R, G, and B analogue electric signals to A/D (Analogue to Digital) conversion, shading conversion, digital image processing, and the like, and eventually generates image data that is made up of color components C (cyan), M (magenta), Y (yellow), and K (black). The image processing unit 112 then stores the generated image data into an image memory 440 (see FIG. 3).

The printer unit 200 includes a laser control unit 201, a photoconductive drum 207, and toner developing units 210 to 213, and forms an image on a recording sheet by utilizing these units. In the printer unit 200, prior to image formation, an eraser lamp 208 neutralizes any surface potential remaining on the surface of the photoconductive drum 207, and a sensitizing charger 209 then uniformly charges the entire surface of the photoconductive drum 207.

Following this, the laser control unit 201 reads image data from the image memory 440 every time when a copy is made. The laser control unit 201 generates a laser diode driving signal, based on the image data read from the image memory 440, so as to control the laser diode 202 to emit a laser beam. The laser beam emitted from the laser diode 202 is deflected by a polygon mirror 203, passes through a f-θ lens 204 and reflective mirrors 205 and 206. The surface of the photoconductive drum 207 is illuminated with the laser beam, to form an electrostatic latent image on the photoconductive drum 207.

The electrostatic latent image is formed on the photoconductive drum 207 in the order of respective color components C, M, Y, and K. The toner developing units 210 to 213 for the respective color components C, M, Y, and K each develop the electrostatic latent image of the corresponding color component, to form a toner image. In parallel with this, a recording sheet is transported from one of paper feed cassettes 215 to 217, and is absorbed onto a transfer drum 219 by an electrostatic absorption charger 218 that is provided opposed to a transport roller 223. The toner image on the photoconductive drum 207 is then transferred to the recording sheet on the transfer drum 219 by the transfer charger 214. The toner image is transferred onto the recording sheet four times, one color component at a time, and then a separating charger 220 neutralizes electric charge accumulated on the surface of the transfer drum 219, so that the recording sheet is separated from the transfer drum 219. Following this, the transferred toner image is fixed to the recording sheet by a fixing unit 221. Finally, the recording sheet is discharged onto a tray 222.

It should be noted here that the fixing unit 221 fixes the toner image on the recording sheet by heating and fusing the toners thereon. The copier 1 is capable of adjusting a peak value of power consumed by the fixing unit 221, by controlling output, i.e., the heating temperature, of the fixing unit 221. The copier 1 keeps the heat quantity applied to the recording sheet at a fixed value, by slowing the rotating speed of the transport roller 223 when the heating temperature of the fixing unit 221 is lowered, and increasing the rotating speed of the transport roller 223 when the heating temperature of the fixing unit 221 is raised. The copier 1 performs the fixing process at high speed for a job in normal mode, and performs the fixing process at low speed for a job in low-speed mode. Accordingly, consumption power for a job in normal mode is large, whereas consumption power for a job in low-speed mode is small.

The copier 1 is supplied with electric power by a commercial power supply via a power supply unit 500. The power supply unit 500 is equipped with an electric power meter 510 for measuring power that is being consumed by the copier 1 and a power amount that has been consumed by the copier 1. The electric power meter 510 includes both a watthour meter and a watt meter, and measures and displays power that is being consumed by the copier 1 and a power amount that has been consumed by the copier 1. The electric power meter 510 is reset when power supply of the copier 1 is turned on, and then starts measuring.

2.2 Control Panel

Figure 2:
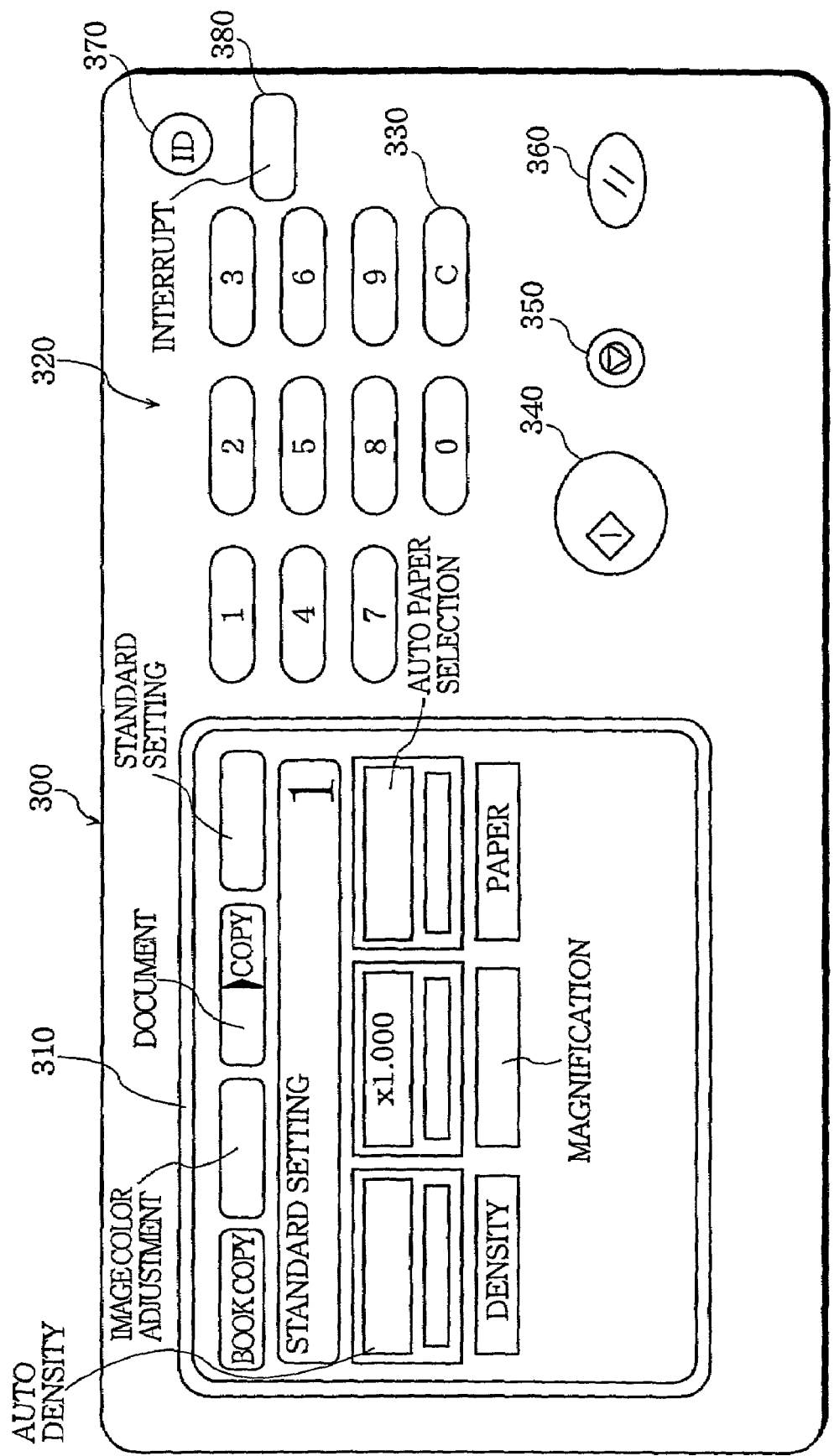
FIG. 2 is a front view showing a control panel of the copier relating to the embodiment of the present invention.

FIG. 2 is a front view of the control panel 300. The LCD touch panel 310 displays various messages such as an operation mode message, a paper jam message, and a paper-out message. Also, the LCD touch panel 310 includes a touch key for setting an operation mode in accordance with a message. A ten key 320 is used for setting the number of copies to be made. A clear key 330 is used for resetting the number of copies to "1". A start key 340 is used for starting the copy operation. A stop key 350 is used for stopping the copying operation. A panel reset key 360 is used for resetting copy conditions such as density and magnification to standard values. An interrupt key 380 is also provided.

An ID key 370 is used for entering a four-digit ID code (secret identification code) that is inputted via the ten key 320 before the copy operation is started. Because the copier 1 is shared by a plurality of groups, an ID code for each group is registered in the copier 1, for the purpose of performing the power (amount) management for each group. The ID code of each group is disclosed only to users that belong to the corresponding group. The copier 1 is constructed to accept a copy (a job) submitted by a user only after the user inputs the ID code of his or her group.

First, the user inputs the ID code using the ten key 320, and presses the ID key 370, so that the input ID code is stored in a buffer memory (not shown). The user then presses the copy start key 340, so that the copy operation is started and at the same time the ID code in the buffer memory is stored in an ID code storage area (not shown) in a RAM 430 that is described later. The ID code stored in the RAM 430 is deleted when the job started by pressing the copy start key 340 is completed. By referring to the ID code storage area, therefore, a judgment as to whether a job submitted by any group is currently being executed or not can be performed, and also, when the job is currently being executed, the group that has submitted the job can be identified.

It should be noted that ID codes are stored in a nonvolatile memory 450 (see FIG. 3) described later, with each ID code being associated with group No. described later.

When receiving a job, the LCD touch panel 310 also receives a priority level of the job. In the present embodiment, two priority levels are available, namely, low-priority and high-priority. According to the received priority level, an execution mode of a job is determined. Here, the copier 1 has two execution modes, namely, normal mode and low-speed mode. In normal mode, an image is formed at higher speed than in low-speed mode, and its consumption power is larger. In low-speed mode, an image is formed at lower speed, and its consumption power is smaller. The copier 1 executes a job with low-priority either in normal mode or in low-speed mode, and always executes a job with high-priority not in low-speed mode but in normal mode.

It should be noted here that although two priority levels and two execution modes are available in the present embodiment, the present invention is applicable when two or more priority levels and two or more execution modes are available. For example, five priority levels may be provided, and three execution modes additionally including "suspension mode" for temporarily suspending execution of a job may be provided.

2.3 Control Unit

Figure 3:
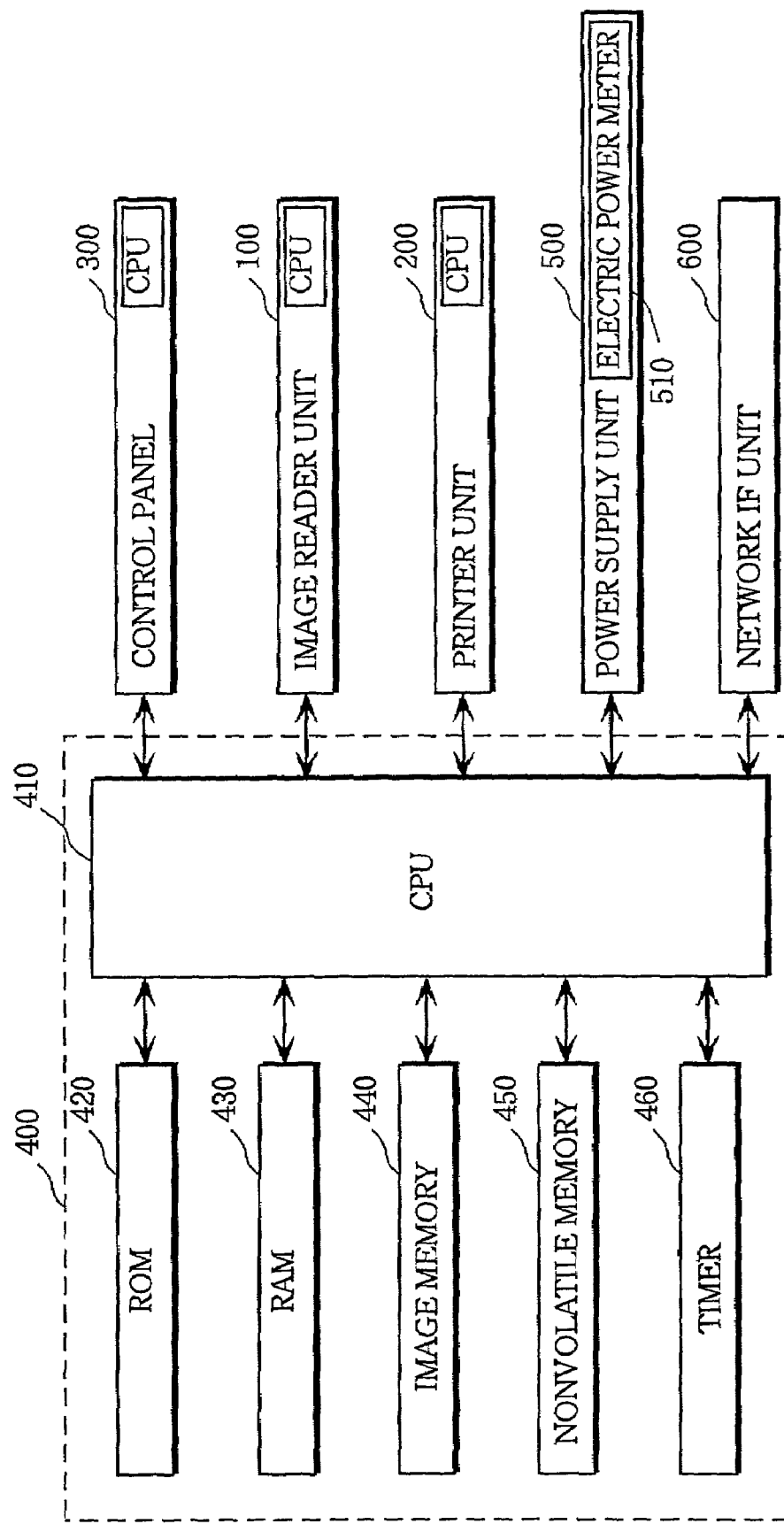
FIG. 3 shows the construction of a control unit of the copier relating to the embodiment of the present invention.

FIG. 3 shows the control unit of the copier. The control unit 400 includes a CPU (Central Processing Unit) 410, a ROM (Read Only Memory) 420, and a RAM (Random Access Memory) 430, etc. The CPU 410 is connected to the ROM 420, the RAM 430, the image memory 440, the nonvolatile memory 450, and a timer 460. The ROM 420 stores programs to be executed by the CPU 410. The RAM 430 is a work memory. The image memory 440 temporarily stores image data of a document read by the image reader unit 100 and image data inputted from a network IF unit 600. The image memory 440 has an enough capacity to store image data of a plurality of documents. The nonvolatile memory 450 is a backup memory.

The CPU 410 transfers data relating to image formation, such as copy conditions stored in the RAM 430 and image data stored in the image memory 440 to the nonvolatile memory 450, and stores them therein for backup, when power supply of the copier 1 is cut off. Then, when power is supplied, the CPU 410 refers to the data stored in the nonvolatile memory 450 to recover the state immediately before power supply is cut off (resume function).

The image reader unit 100, the printer unit 200, and the control panel 300 each include a CPU. The CPU 410 performs serial communication with the image reader unit 100, the printer unit 200, the control panel 300, the power supply unit 500, and the network IF unit 600, and controls these units so as to operate in a coordinated manner. It should be noted that each of the image reader unit 100, the printer unit 200, and the control panel 300 includes a dedicated CPU. Also, the power supply unit 500 is equipped with the electric power meter 510 as mentioned above, and responds with a current value indicated by the electric power meter 510 as requested by the CPU 410.

3. Operation of the Copier

The following describes the operation of the copier 1, focusing on the operation of the control unit 400.

Figure 4:
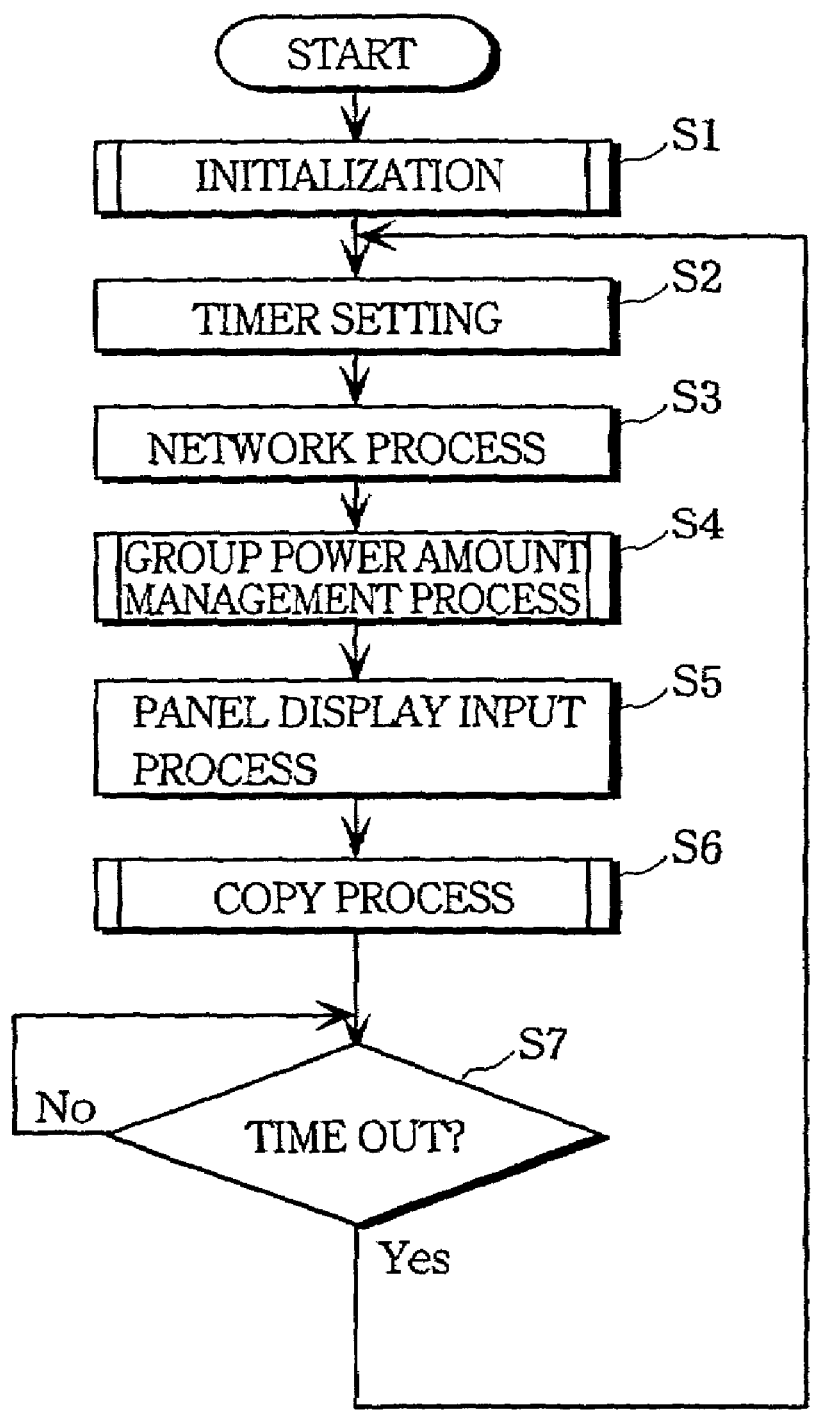
FIG. 4 is a flowchart showing a main loop process executed by a CPU of the control unit.

FIG. 4 is a flowchart showing the processing of the CPU 410, particularly showing a main loop. When power is supplied, the CPU 410 first executes an initialization process in accordance with a boot program stored in the ROM 420 (step S1). The CPU 410 then reads, from the ROM 420, a timer value that defines length of one routine, and sets the timer 460 (step S2). Following this, the CPU 410 performs a communication process via the network IF unit 600 (step S3), a power amount management process for each group (step S4), and a control panel input/output process (step S5). Further, the CPU 410 executes a copy process (step S6), and then refers to the timer 460. If a time period that corresponds to the timer value has not passed yet ("No" in step S7), the CPU 410 repeats the reference to the timer 460. At the point when the time period that corresponds to the timer value passes ("Yes" in step S7), the CPU 410 returns the processing to step S2.

3.1 Power Management Table

A power management table set is stored in the nonvolatile memory 450 for the purpose of managing "power" and "power amount". The power management table set is composed of three tables, i.e., power management tables A to C. FIGS. 5A to 5C respectively show the constructions of the power management tables A to C.

The power management table A is held by each copier for managing its power and power amount. FIG. 5A shows the power management table A that is held by one copier (here, copier k). The power management table A includes the "group n's maximum power Pmn" field, the "group n's maximum power amount Wmn" field, the "copier k's consumption power by group n Pnk" field, and the "copier k's consumption power amount by group n Wnk" field, in association with group No. of each of the groups that use the copier k. The power management table A also includes the "sum" field showing the overall maximum power Pm, the overall maximum power amount Wm, the sum of values for the consumption power Pnk, and the overall consumption power amount Wc.

Note here that group No. 0 is not allocated to any specific group, but indicates a common group area in which a power amount consumed by copier k while it is used by any groups (a power amount consumed while a copier is in an idle state (hereafter referred to as an "idle-state power amount") is recorded. Note also that the maximum power Pnk being "0W" or the maximum power amount Wmn being "0 kWh" indicates that the maximum power and the maximum power amount are not set on a group basis. In such a case, the copier k does not obtain power or a power amount when judging whether a new job can be executed or not.

The power management table B is used for managing "power amount". As FIG. 5B shows, the power management table B includes the "group n's maximum power amount Wmn" field, the "consumption power amount by group n Wcn" field, and the "judgment result" field, in association with group No. of each of the groups that use the copier k. The "judgment result" field shows whether a job can be executed or not. The copiers 1 to K pass the contents of the power management table A with one another. By doing so, each copier can obtain the consumption power amount Wcn for each group, and can store it in the power management table B. Also, the copier k compares, as to each group, the maximum power amount Wmn with the consumption power amount Wcn, and stores, in the "judgment result" field, (a) a message "OK" when the consumption power amount Wcn is equal to or smaller than the maximum power amount Wmn, and (b) a message "NG" when the consumption power amount Wcn is greater than the maximum power amount Wmn. The power management table B also includes the "sum" field showing the overall maximum power amount Wm, the overall consumption power amount Wc, and the overall judgment result.

Note here that as in the power management table A, group No. 0 indicates a common group area in which a sum of consumption power amounts Pnk (n=0) each corresponding to group No. 0 in the power management tables A held by each of the copiers 1 to K is recorded.

Figure 6:
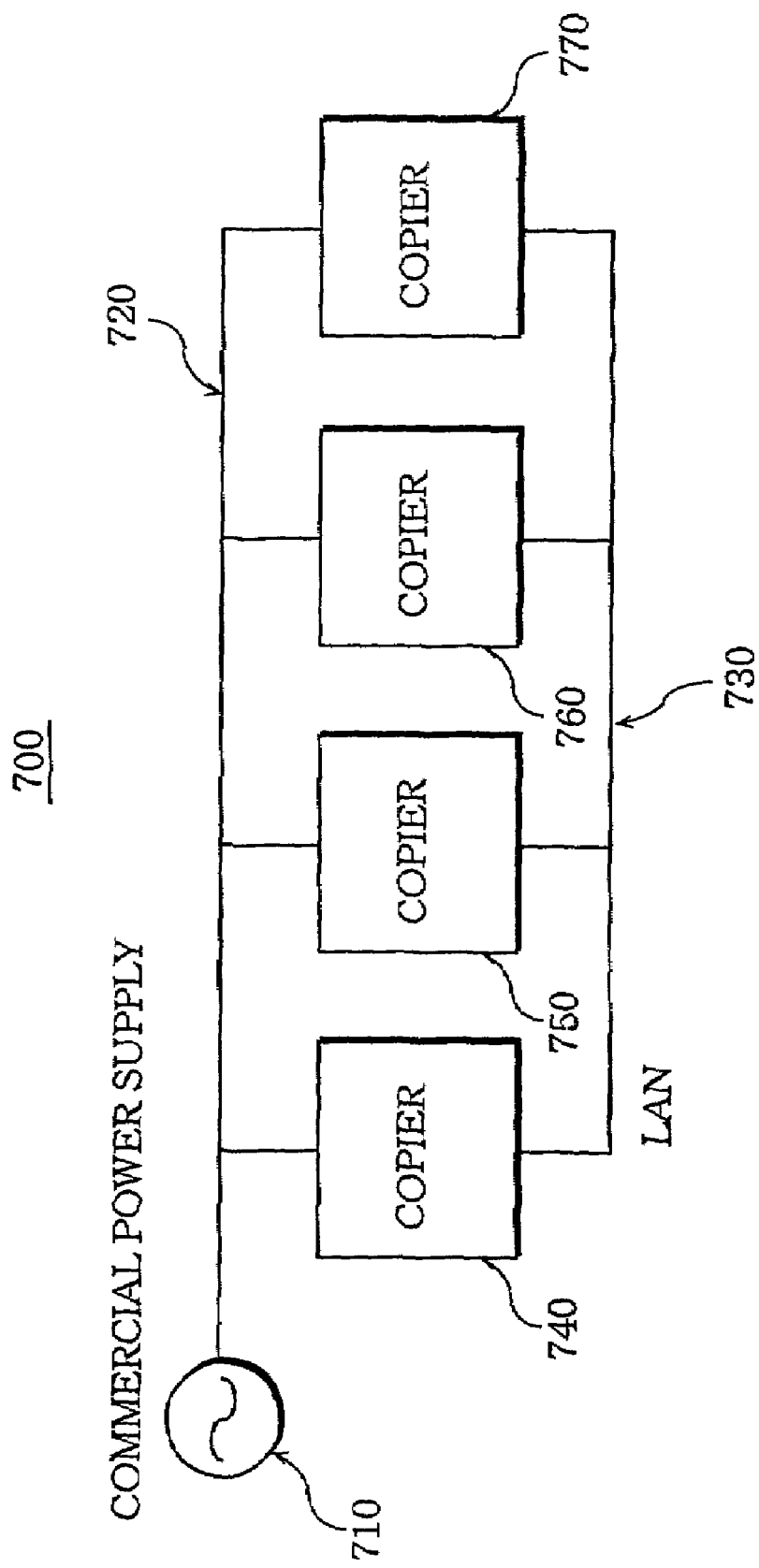
FIG. 6 shows the construction of a communication network connecting a plurality of copiers relating to the present invention.

FIG. 6 shows the construction of a copy system in which the copiers 1 to K are connected with one another. The copy system 700 has the construction to connect a plurality of copiers 740 to 770 via a LAN (Local Area Network), and further includes a commercial power supply 710 and a power supply system 720. The copiers 740 to 770 receive power supply from the commercial power supply 710 via the power supply system 720. The copiers 740 to 770 each pass the contents of its power management table A with one another in accordance with the procedure defied by the TCP/IP (Transmission Control Protocol/Internet Protocol).

The power management table C is used for managing "power". As FIG. 5C shows, the power management table C includes the "group n's maximum power Pmn" field, the "consumption power by group n Pn" field, and the "judgment result" field, in association with group No. of each of the groups that use the copier k. Upon receipt of the contents of the power management table A from each of the other copiers, the copier k obtains the consumption power Pn for each group, and stores it in the power management table C. Also, the copier k compares, as to each group, the maximum power Pmn with the consumption power Pn, and stores, in the "judgment result" field, (a) a message "OK" when the consumption power Pn is equal to or smaller than the maximum power Pmn, and (b) a message "NG" when the consumption power Pn is greater than the maximum power Pmn. The power management table C also includes the "sum" field showing the overall maximum power Pm, the sum of values for the consumption power Pn, and the overall judgment result.

Figure 7:
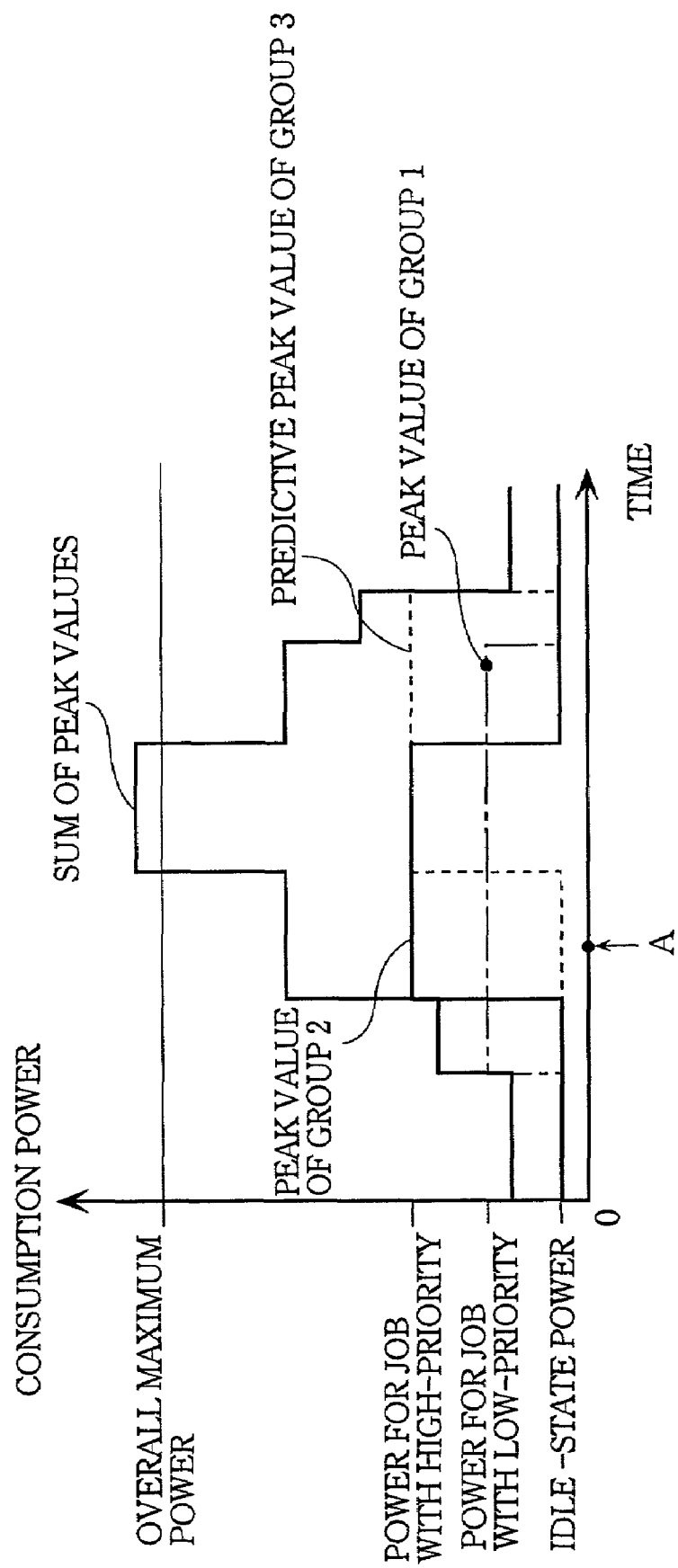
FIG. 7 is a graph showing a judgment example of consumption power when a job is submitted.

FIG. 7 is a graph showing a judgment example as to whether a job submitted in the copier k can be executed or not. The vertical axis indicates the "consumption power Pn", and the horizontal axis indicates "time". In the figure, a job has been submitted by group 1 and a job has been submitted by group 2. At the point "A", the job submitted by group 1 is being executed with low-priority, and so a peak value of consumption power P1 is low. On the other hand, the job submitted by group 2 is being executed with high-priority, and so a peak value of consumption power P2 is high. Suppose that a job with high-priority is submitted by group 3 at this point. The job is with high-priority, and so has a high peak value of consumption power P3. Accordingly, the sum of the peak values exceeds the overall maximum power Pm. In this case, the copier 1 does not execute the job submitted by group 3.

The overall maximum power Pm, the group n's maximum power Pmn, and the group n's maximum power amount Wmn stored in the power management table A are set using the control panel 300. FIG. 8 shows a group power management setting screen 800 that is displayed on the LCD touch panel 310 of the control panel 300. In the group power management setting screen 800, the overall consumption power amount Wc and the consumption power amount by group n Wcn stored in the power management table B and the consumption power by group n Pn stored in the power management table C are displayed, in addition to the overall maximum power Pm, the group n's maximum power Pmn, the overall maximum power amount Wm, and the group n's maximum power amount Wmn. It should be noted here that the unit for "power" is watt (W), and that the unit for "power amount" is watt-hour (Wh). The group power management setting screen 800 further includes, in its lower part, two buttons, namely, a display switch button 810 and an OK button 820.

Among the contents displayed in the group power management setting screen 800, new values for the maximum values (the overall maximum power Pm, the group n's maximum power Pmn, and the group n's maximum power amount Wmn) are set in the following way. When pressure is applied to a display location on the LCD touch panel 310, the copier 1 first sets the pressed field in a setting mode, and receives an input via the ten key 320 as a new set value. The input of the new set value via the ten key 320 is successively displayed in the corresponding field in the group power management setting screen 800. The OK button 820 is pressed to enter the set value. Once the set value is entered, the copier 1 reflects the set value in the power management tables A to C, and passes the contents of the power management table A to the other copiers. The other copiers each refer to the passed contents, and update the contents of their power management tables A to C accordingly.

When the display switch button 810 is pressed, the group power management setting screen 800 switches from the above-described power display mode to fee display mode, and displays a fee corresponding to the maximum power, the maximum power amount, etc., in each field. FIG. 9 shows the group power management setting screen 800 in which the corresponding fees are displayed. In FIG. 9, the "maximum power" field shows, instead of the maximum power Pmn, a fee allocated from the basic electric fee in proportion to the maximum power Pmn for each group. The "maximum power amount" field shows, instead of the maximum power amount Wmn, an electric fee corresponding to the maximum power amount Wmn. The "consumption power" field shows, instead of the consumption power Pn, a fee obtained by multiplexing (a) a rate of the consumption power Pn with respect to the maximum power Pmn by (b) the maximum power Pmn shown in the "maximum power" field. The "consumption power amount" field shows, instead of the consumption power amount Wcn, an electric fee corresponding to the consumption power amount Wcn.

In fee display mode, the group power management setting screen 800 receives a corresponding electric fee as a new set value for the maximum power amount Wmn via the LCD touch panel 310 and the ten key 320. In this case, once the set value is entered, the copier 1 converts the input electric fee into a power amount, updates the power management tables A and B, and passes the contents of the power management table A to the other copiers. For the maximum power Pmn, the copier 1 does not receive an electric fee but receives only a watt value as a new set value.

3.2 Group Power Amount Management Process Routine (Step S4)

Figure 10:
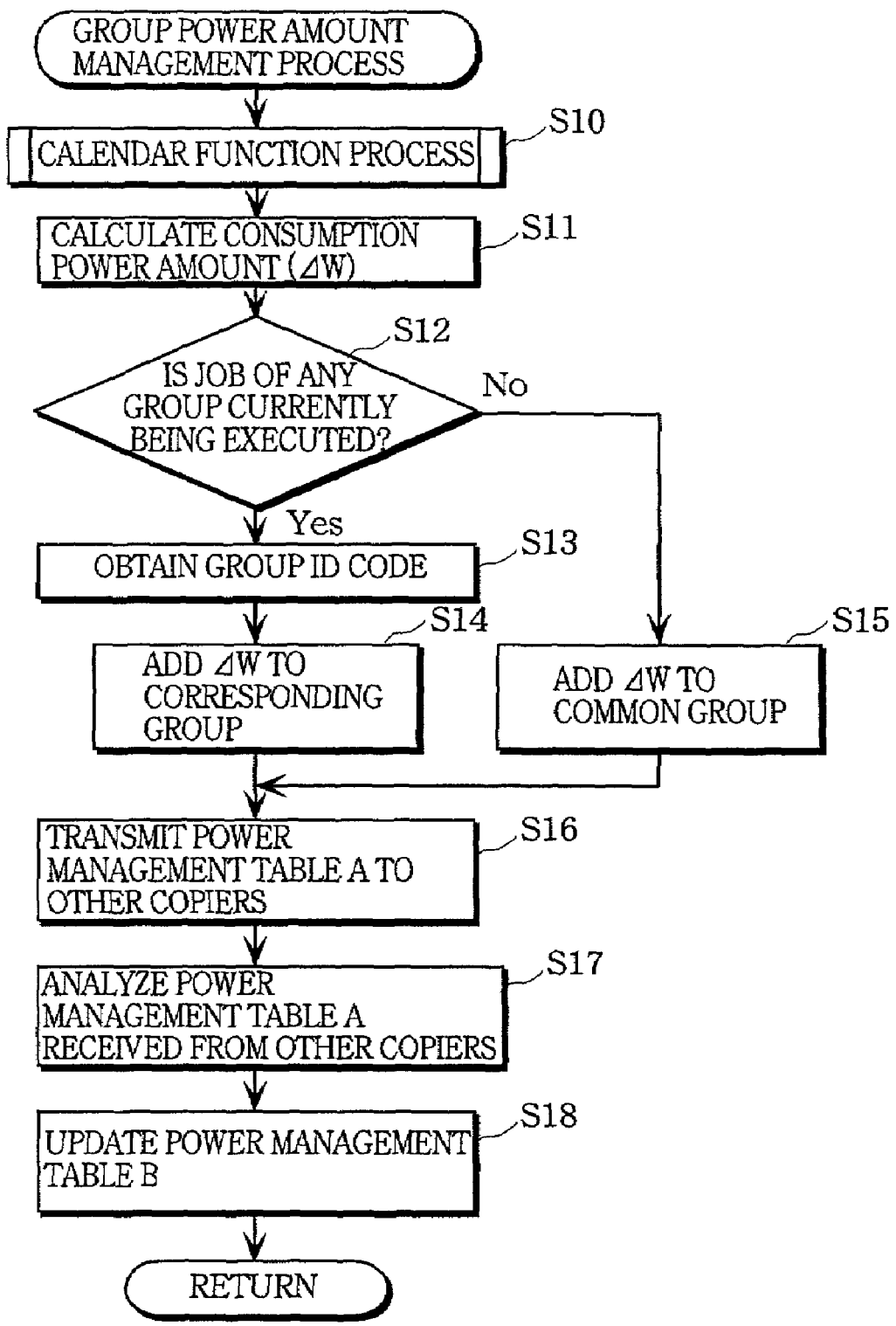
FIG. 10 is a flowchart showing the operation contents of a group power amount management process (step S4 in FIG. 4)

The following describes a flowchart showing the group power amount management process routine (step S4 in FIG. 4). FIG. 10 is a flowchart showing the group power amount management process routine.

The CPU 410 executes a calendar function process that is described later (step S10), and then refers to the electric power meter 510 to obtain the power amount "$\Delta$W" consumed by the copier 1 during a predetermined time period (step S11). In detail, the power amount "$\Delta$W" is obtained by subtracting (a) a power amount obtained with reference to the electric power meter 510 previously, from (b) a power amount obtained with reference to the electric power meter 510 this time. It should be noted here that the CPU 410 refers to the electric power meter 510 once in every one cycle of the main routine described in FIG. 4.

Following this, the CPU 410 refers to the ID code storage area within the RAM 430, to judge whether a job submitted by any group is currently being executed or not (step S12). When judging that a job is currently being executed ("Yes" in step S12), the CPU 410 obtains an ID code of the group that has submitted the job currently being executed (step S13). Then, the CPU 410 reads a consumption power amount that is associated with group No. corresponding to the obtained ID code in the power management table A, and adds the power amount "$\Delta$W" to the read consumption power amount, and stores the resulting value into the same field (step S14).

On the other hand, when judging that no job is currently being executed ("No" in step S14), the CPU 410 adds the power amount "$\Delta$W" to a consumption power amount of a common group (with group No. 0) in the power management table A in the same way as describe above (step S15). This means that a power amount consumed while no job of any group is being executed (an idle-state power amount) is calculated as a consumption power amount of the common group.

After updating the power management table A (steps S14 or S15), the CPU 410 transmits, via the network IF unit 600, the contents of the updated power management table A to all the other copiers connected via the network (step S16).

Following this, the CPU 410 analyses contents of the power management table A that have been received from the other copiers (step S17), and updates the power management table B (step S18). In more detail, the following processing is performed to update the power management table B.

Using the contents of the power management table A received from the other copiers and the contents of the power management table A of the copier 1, the CPU 410 obtains a sum of the consumption power amounts for each group, and updates the relevant fields of the power management table B. When there are changes in the maximum power amount for any group in any of the other copiers, the CPU 410 updates the maximum power amount of the relevant fields in the power management table B accordingly.

Further, the CPU 410 obtains a sum of maximum power amounts for each group, and a sum of consumption power amounts for each group, and then updates the relevant fields in the power management table B.

Moreover, the CPU 410 updates the "judgment result" field in the power management table B as follows. For group Nos. and the "sum" field showing that the consumption power amount is equal to or greater than the maximum power amount, the CPU 410 sets the "judgment result" filed at "NG". For group Nos. and the "sum" field showing that the consumption power amount is lower than the maximum power amount, the CPU 410 sets the "judgment result" field at "OK".

Also, although in the above group power amount management process an idle-state power amount is calculated as a consumption power amount of the common group (step S15), the idle-state power amount may be divided equally for each group registered in the copier 1, and the divided idle-state power amount may be added to the consumption power amount of each group. As described above, by assigning an idle-state power amount on each group, users in each group are motivated to switch off a copier while not in use for a long time etc., (for example, from when users reach company to when a copier is firstly used, or during a lunch break), thereby further promoting the energy-saving measures.

Figure 11:
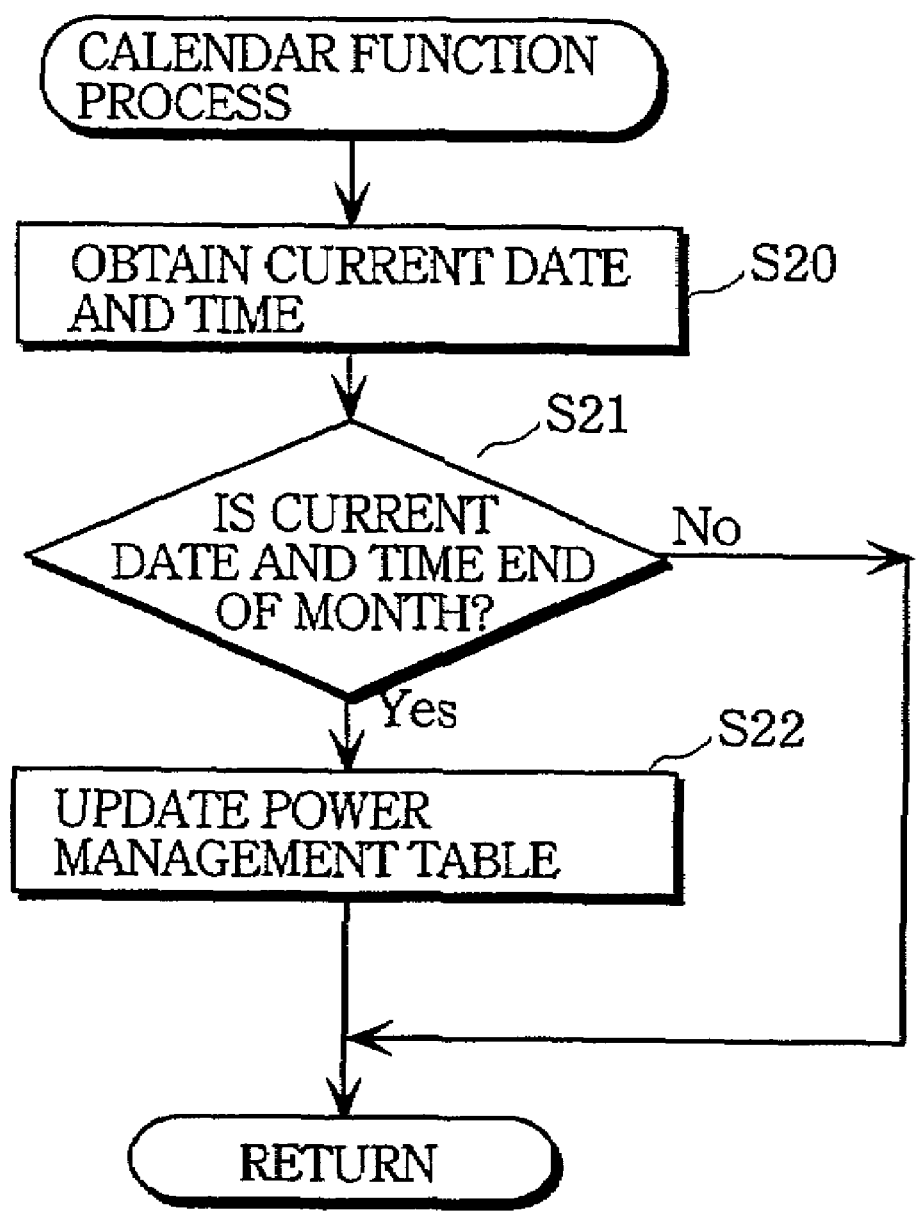
FIG. 11 is a flowchart showing the operation contents of a calendar function process (step S10 in FIG. 10)

FIG. 11 is a flowchart showing the calendar function process (step S10 in FIG. 10). In the present embodiment, power management is performed in units of months, and the purpose of the calendar function process is to reset a consumption power amount managed by the power management tables at the end of every month. Here, it is needless to say that the power management may be performed not in units of months, but in freely-chosen units, such as units of days, weeks, or years.

First, the CPU 410 obtains the current date and time (step S20), and judges whether the current date and time is the date and time at the end of month (for example, 12:00 p.m. on the last day of month) or not (step S21). When judging that the current date and time is not the date and time at the end of month ("No" in step S21), the CPU 410 skips step S22, and returns the processing.

On the other hand, when judging that the current date and time is the data and time at the end of month, the CPU 410 advances the processing to step S22, and updates the power management table A and the power management table B. In detail, the CPU 410 compares the consumption power amount and the maximum power amount for each group in the power management table A and the power management table B. Then, for groups whose consumption power amount is equal to or less than the maximum power amount, the CPU 410 resets the consumption power amount in the corresponding field to "0". For groups whose consumption power amount exceeds the maximum power amount, the CPU 410 stores an excess amount by which the consumption power amount exceeds the maximum power amount into the corresponding field, so that the excess amount can be added to a consumed power amount of the next month. By carrying the excess power amount over to the next month in this way, power amount management can be performed appropriately over a long period of time (over a plurality of months) It should be noted that a consumed power amount can exceed a maximum power amount due to the following reasons. It may occur because continued execution of a job is permitted by the processing described later when the consumption power amount reaches the maximum power amount during execution of the job. It may also occur in the above-described case where the idle-state power amount is equally divided for each group. In this case, the consumption power amount may exceed the maximum power amount while a job is not being executed, and further, an idle-state power amount may subsequently be added to the consumption power amount.

3.3 Copy Process Routine (step S6)

Figure 12:
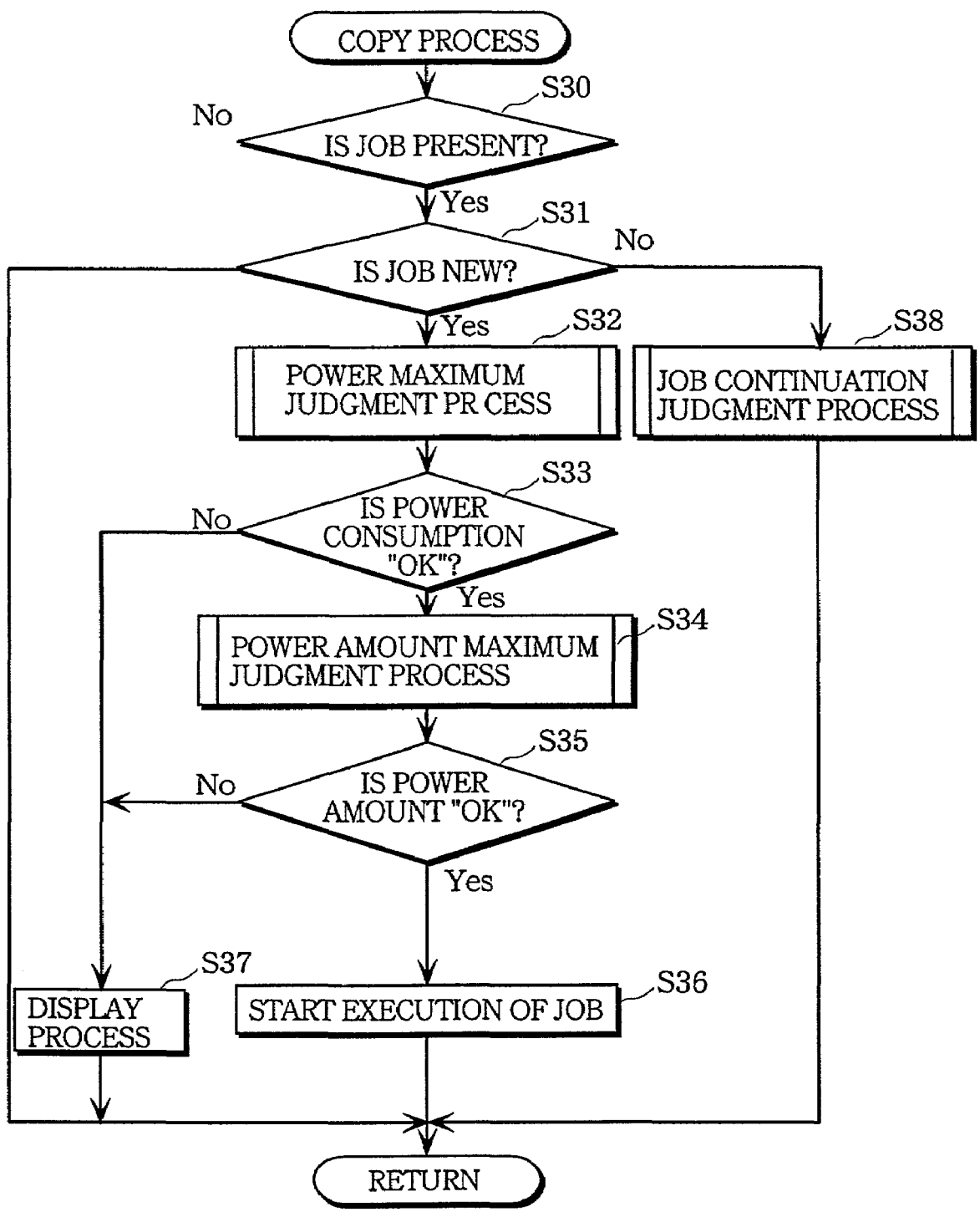
FIG. 12 is a flowchart showing the operation contents of a copy process (step S6 in FIG. 4)

FIG. 12 is a flowchart showing the operation contents of the copy process routine (step S6 in FIG. 4). In the copy process routine, the CPU 410 first judges whether a job that is to be executed or a job that is currently being executed is present or not. When such a job is not present ("No" in step S30), the CPU 410 ends the copy process routine. When such a job is present ("Yes" in step S30), the CPU 410 judges whether the job is to be newly executed (hereafter referred to as a "new job") or not. When the job is not a new job ("No" in step S31), the CPU 410 executes a job continuation judgment process that is described later (step S38), and ends the processing.

On the other hand, when the job is a new job ("Yes" in step S31), the CPU 410 executes a power maximum judgment process that is described later (step S32). When a judgment result of the power maximum judgment process is "NG" ("No" in step S33), the CPU 410 makes a message "NG" displayed on the LCD touch panel 310 (step S37), and ends the processing. When a judgment result of the power maximum judgment process is "OK", the CPU 410 executes a power amount maximum judgment process that is described later (step S34). When a judgment result of the power amount maximum judgment process is "NG" ("No" in step S35), the CPU 410 makes a message "NG" displayed on the LCD touch panel 310 (step S37), and ends the processing. When a judgment result of the power amount maximum judgment process is "OK" ("Yes" in step S35), the CPU 410 starts executing the new job (step S36).

3.3.1 Job Continuation Judgment Process Routine (step S38)

Figure 13:
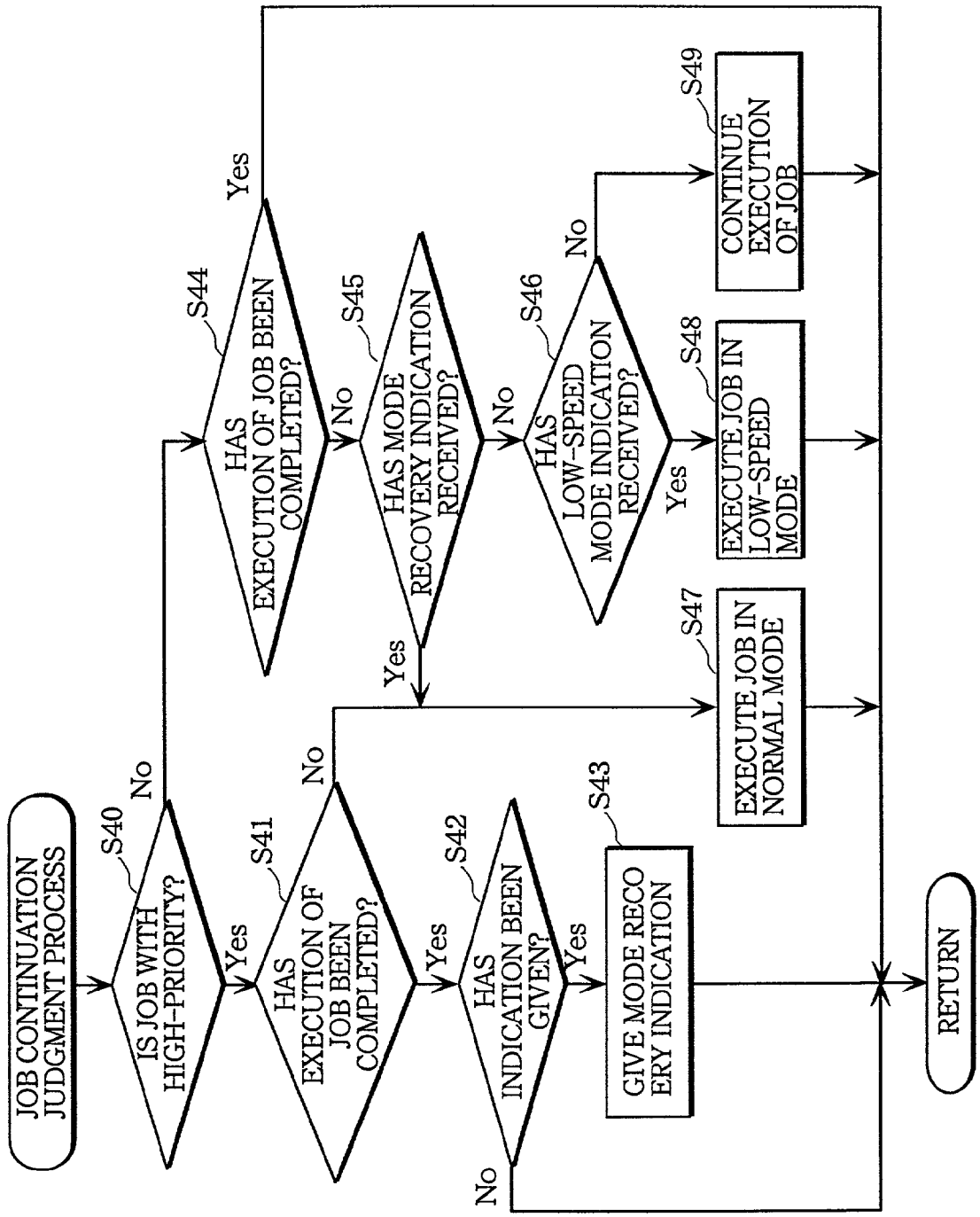
FIG. 13 is a flowchart showing the operation contents of a job continuation judgment process (step S38 in FIG. 12)

FIG. 13 is a flowchart showing the operation contents of the job continuation judgment process routine (step S38 in FIG. 12). In the job continuation judgment process routine, the CPU 410 first judges a priority level of the current job. When judging that the current job has low-priority ("No" in step S40), the CPU 410 judges whether execution of the current job has been completed or not. When judging that the execution of the current job has been completed ("Yes" in step S44), the CPU 410 ends the job continuation judgment process routine. When judging that the execution of the current job has not been completed yet ("No" in step S44), the CPU 410 judges whether a mode recovery indication to recover from low-speed mode to normal mode has been received from another copier via a LAN 730 or not.

When judging that the mode recovery indication has been received ("Yes" in step S45), the CPU 410 switches the execution mode of the current job from low-speed mode to normal mode, and continues execution of the current job (step S47). When judging that the mode recovery indication has not been received ("No" in step S45), the CPU 410 judges whether a low-speed mode indication to switch the execution mode of the current job from normal mode to low-speed mode has been received or not. When judging that the low-speed mode indication has been received ("Yes" in step S46), the CPU 410 switches the execution mode of the current job from normal mode to low-speed mode, and continues the execution of the current job. At this point, the copier 1 records the other copier from which the low-speed indication has been received. This is due to the following reason. When the copier 1 receives a mode recovery indication to switch the execution mode from low-speed mode to normal mode from another copier, the CPU 410 of the copier 1 judges whether the other copier is the same as the recorded copier or not, and recovers the execution mode only when this judgment is affirmative (step S48). When the low-speed mode indication has not been received ("No" in step S46), the CPU 410 continues the execution of the current job without switching the execution mode (step S49).

When judging that the current job has high-priority ("Yes" in step S40), the CPU 410 judges whether execution of the current job has been completed or not. When judging that the execution of the current job has not been completed yet ("No" in step S41), the CPU 410 continues the execution the current job in normal mode (step S47). When judging that the execution of the current job has been completed ("Yes" in step S41), the CPU 410 judges whether the copier 1 has given a low-speed indication to any other copiers via the LAN 730 or not. When judging that the copier 1 has not given a low-speed indication to any other copiers ("No" in step S42), the CPU 410 ends the job continuation judgment process routine. When judging that the copier 1 has given a low-speed indication to another copier ("Yes" in step S42), the CPU 410 gives a mode recovery indication to the other copier to which the low-speed mode indication has been given (step S43), and ends the job continuation judgment process routine.

3.3.2 Power Maximum Judgment Process Routine (step S32)

Figure 14:
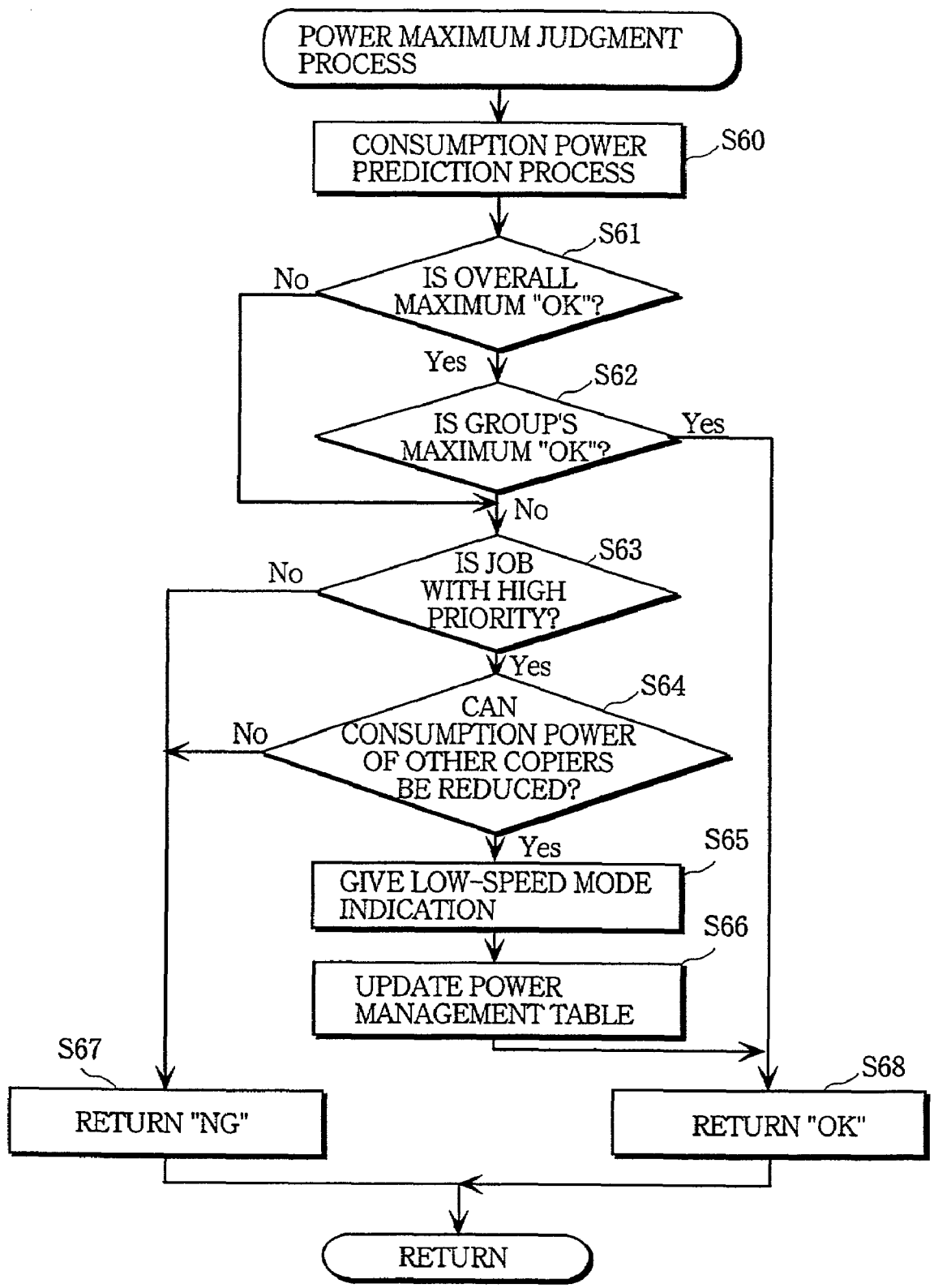
FIG. 14 is a flowchart showing the operation contents of a power maximum judgment process routine (step S32 in FIG. 10)

FIG. 14 is a flowchart showing the operation contents of the power maximum judgment process routine (step S32 in FIG. 12). In the power maximum judgment process routine, the CPU 410 first predicts power to be consumed for executing a new job (a value Pnk when a job submitted by group n is executed in the copier k). In the present embodiment, the copier 1 has, on the RAM 430, a consumption power table storing consumption power in association with each job execution mode. From this table, the CPU 410 reads consumption power that is associated with normal mode, and sets the read consumption power as a predictive consumption power for the new job (step S60). Following this, the CPU 410 refers to the power management table C, and adds (a) the sum of values for the consumption power Pn to (b) the predictive consumption power for the new job, to obtain a predictive overall consumption power. The CPU 410 then compares the obtained predictive overall consumption power and the overall maximum power Pm. When the predictive overall consumption power is smaller ("Yes" in step S61), the CPU 410 refers to the power management table C again, and obtains a predictive consumption power of a group corresponding to a designated group ID, by adding the group's consumption power Pmn to the predictive consumption power of the new job. The CPU 410 compares the obtained group's predictive consumption power and the group's maximum power Pmn. When the group's predictive consumption power is smaller ("Yes" in step S62), the CPU 410 returns a message "OK" (step S68), and ends the power maximum judgment process routine.

When the predictive overall consumption power is larger than the overall maximum power Pm ("No" in step S61), or when the group's predictive consumption power is larger than the group's maximum power Pmn ("No" in step S62), the CPU 410 judges whether the new job has high-priority or not. When judging that the new job has low-priority ("No" in step S63), the CPU 410 returns a message "NG" (step S67), and ends the power maximum judgment process routine. When judging that the new job has high-priority ("Yes" in step S63), the CPU 410 refers to the power management tables, and judges priority levels of jobs that are being executed by other copiers. Then, the CPU 410 obtains execution modes of other copiers that are currently executing a job with low-priority. When any of the copiers are executing a job with low-priority in normal mode, the CPU 410 judges whether the predictive overall consumption power is reduced to be equal to or less than the overall maximum power Pm by switching the execution mode of the copiers that are executing a job with low-priority in normal mode to low-speed mode so as to reduce their consumption power. The CPU 410 also judges whether the group's predictive consumption power is reduced to be equal to or less than the group's maximum power Pmn by reducing these copier's consumption power in this way. When judging that both the overall and group's predictive consumption power is reduced to be equal to or less than the overall and group's maximum power respectively ("Yes" in step S64), the CPU 410 of the copier 1 gives a low-speed mode indication to the other copiers that are currently executing a job with low-priority in normal mode, so that the other copiers switch the execution mode to low-speed mode (step S65) The CPU 410 of the copier 1 waits for responses from the other copiers, and then updates the power management tables (step S66). Here, the copier 1 records the other copiers that have switched the execution mode from normal mode to low-speed mode in response to the low-speed mode indication of the copier 1. This is because the copier 1 should give a mode recovery indication to those copiers to switch from low-speed mode to normal mode, once the execution of the new job is completed in those copiers. On the other hand, if either of the overall and group's predictive consumption power is not reduced to be equal to or less than the overall and group's maximum power ("No" in step S64), the CPU 410 judges that the new job cannot be executed even if consumption power of other copiers is reduced, and therefore, returns a message "NG" (step S67) and ends the power maximum judgment process routine.

It should be noted here that the overall maximum power Pm may be set equal to a sum of values for each group's maximum power Pmn, or may be set smaller than the sum of values for each group's maximum power Pmn. In the former case, users in each group can use a copier within the range of the group's maximum value. In the latter case, more power can be allocated to users in each group, and therefore, such a case where the group's maximum value prohibits execution of a job despite that the overall maximum power Pm still has available power, can be avoided. Accordingly, jobs can be submitted more efficiently while the overall maximum power Pm is being kept low.

3.3.3. Power Amount Maximum Judgment Process Routine (step S34)

Figure 15:
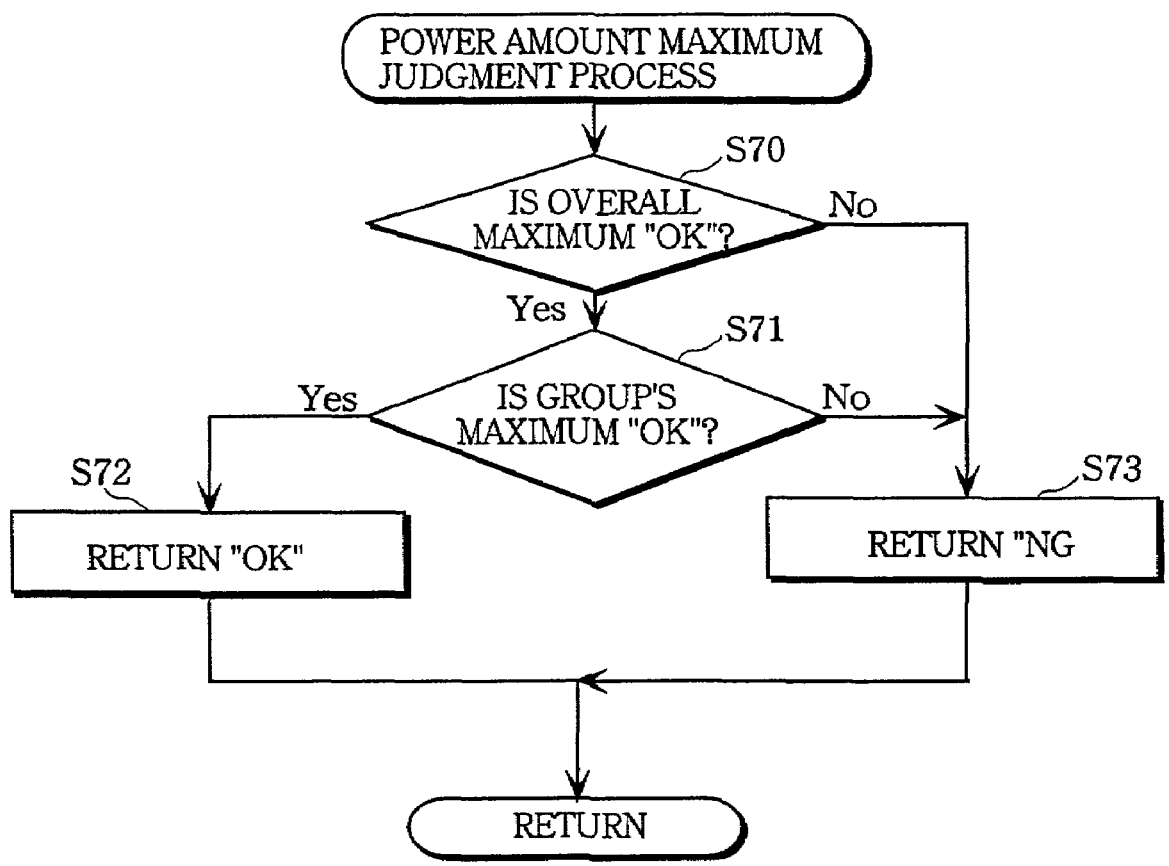
FIG. 15 is a flowchart showing the operation contents of a power amount maximum judgment process routine (step S34 in FIG. 12).

FIG. 15 is a flowchart showing the operation contents of the power amount maximum judgment process routine (step S34 in FIG. 12). In the power amount maximum judgment process, the CPU 410 first refers to an execution judgment result in the "sum" field in the power management table B. When the execution judgment result is "NG" ("No" in step S70), in other words, when the overall consumption power amount of copiers connected via the LAN 730 is equal to or greater than a sum of the maximum power amounts set for the groups, the CPU 410 returns a message "NG" to the copy process routine that is the upper routine (step S73), and returns the processing to the copy process routine (FIG. 12).

On the other hand, when the execution judgment result is "OK" ("Yes" in step S70), the CPU 410 advances the processing to step S71, and refers to the "judgment result" field in the power management table B that is associated with a group that has submitted the new job. When the execution judgment result is "NG" ("No" in step S71), in other words, when the power amount consumed for executing jobs submitted by the group is equal to or greater than the maximum power amount allocated to the group, the CPU 410 returns a message "NG" (step S73), and returns the processing to the copy process routine (FIG. 12). On the other hand, when the execution judgment result is "OK", the CPU 410 returns a message "OK" (step S72), and returns the processing to the copy process routine (FIG. 12).

In the copy process routine (FIG. 12), as described above, execution of a new job (a job that is newly submitted) is started when the message "OK" is returned from the power amount maximum judgment process routine, and execution of a new job is prohibited when the message "NG" is returned from the power amount maximum judgment process.

In the copy process routine (FIG. 12), the judgment as to whether execution of a job is to be restricted in terms of a consumption power amount or not is performed only when a new job is submitted ("Yes" in step S31). Once execution of a job is started, this judgment is not performed while the job is being executed ("Yes" in step S30 and "No" in step S31). Accordingly, even when a consumption power amount becomes equal to or greater than the maximum power amount during execution of the job, the execution of the job is not stopped immediately, but the execution of the job is continued. As a result, paper jam of recording sheets that may occur when execution of a job is stopped suddenly can be avoided.

It should be noted that step S70 may not be provided in the above-described power amount maximum judgment process routine (FIG. 15), when management relating to the overall consumption power amount of the copiers connected via the network is not performed. It should also be noted that step S71 may not be provided, when management relating to a consumption power amount for each group is not performed.

Further, when the consumption power amount management is of importance, with the consumption power management being set aside, the present embodiment may of course be constructed as a copier that is used alone, i.e., a copier of so-called stand-alone type, instead of the copiers connected via the network. When the present embodiment is constructed as a stand-alone copier, among the power management tables in FIGS. 5A to 5C, only the power management table B shown in FIG. 5B may be provided, and amounts of power consumed by the copier may be cumulated in the "consumption power amount" field in this table.

Although the present invention has been described based on the preferred embodiment as above, it should be clear that the present invention is not limited to the above preferred embodiment. For example, the following modifications are possible.

(Modifications)

(1) The above embodiment describes the case where the copiers connected via the LAN 730 each hold the power management tables, and exchange between the copiers, information necessary for updating the power management tables for judging whether execution of a new job is possible or not, and for selecting an execution mode for the new job. However, the following method may instead be employed. The power management tables may be provided intensively within one of the copiers. In this case, the other copiers may report their consumption power to the one copier. To execute a new job, the other copiers may inquire the one copier whether the execution of the new job is possible or not. Also, the other copiers may receive an execution mode indication from the one copier and switch the execution mode in accordance with the indication.

Alternatively, a personal computer may be connected to the LAN 730, and may execute the same processing as the above one copier. To realize this, the personal computer may execute a program relating to the present invention. Also, the program relating to the present invention may be stored in a computer-readable recording medium, so that the program can be executed by the personal computer via the recording medium. The recording medium can be a flexible disk, a CD-ROM, an IC card, and the like.

The above-described modification can eliminate the inconsistency that is likely to occur in the contents of the power management tables held by a plurality of different copiers, thereby enabling consistent power management over the plurality of copiers.

(2) Although the above embodiment describes the case where two execution modes, namely, low-speed mode and normal mode are available in each copier, three or more execution modes may be provided, or a suspension mode for temporally suspending execution of a job may be additionally provided. To realize this, for example, a copier may be provided with selection of three or more speeds at which an image is formed. In this case, enough power to execute a new job can be saved by other copiers, and so the limited power can be utilized more efficiently than in the case where a smaller number of execution speeds are provided. Also, the number of execution speeds may differ depending on each copier.

(3) Although the above embodiment describes the case where two levels of priority, namely, high-priority and low-priority are provided, three or more levels may be provided. When only two priority levels are provided, there may be a case where power to be consumed for executing one of two jobs with the same priority level needs to be reduced. In this case, additional processing is required to allocate power equally to the two jobs. By providing more priority levels, however, such a case is less likely, and accordingly, such additional processing becomes unnecessary.

(4) The above embodiment describes the case where a new job is rejected when the maximum power does not allow its execution. Alternatively, the new job may be queued until necessary power is secured. This saves the user the trouble of submitting the job again.

(5) When each group is charged with a fee for power use in copiers according to its used power amount, a fee measured as a common group's portion may be divided equally for each group, or may be settled using a budget amount set aside in advance for the common group.

(6) Although the above embodiment is described by taking a copier for example, the effects of the present invention can also be produced by other devices as long as they can change a consumption power rate. In detail, the effects of the present invention can be produced by adjusting consumption power between these devices via a network.

(7) The above embodiment describes the case where the copier 1 has, on the RAM 430, the consumption power table that stores consumption power in association with each job execution mode, and consumption power stored in the "normal mode" field therein is referred to and set as a predictive consumption power (step S60). Here, consumption power (in both normal mode and low-speed mode) stored in the consumption power table may be fixed values set in advance, or may be updated appropriately in the following way.

In addition to the electric power meter 510, the power supply unit 500 may be equipped with a watt meter to measure consumption power when a job is executed. This enables consumption power associated with each execution mode in the consumption power table to be updated. The consumption power table may be updated every time when consumption power is measured, or may be updated only when measured consumption power is larger than consumption power associated therewith in the consumption power table.

Also, the consumption power table may be stored in the nonvolatile memory 450, or if not being updated, it may be stored in the ROM 420.

(8) Although the above embodiment describes the case where power to be consumed for executing a job with low-priority is reduced so that saved power can be allocated to a job with high-priority, the following power management may also be employed as a method using priority levels.

A maximum power amount is set in accordance with a priority level, in such a manner that a larger power amount is allocated to a job with high-priority. With this power management method, the power amount maximum judgment process (step S34) may be modified as follows. It should be noted here that in the present modification example a maximum power amount is set in accordance with a priority level of a job. Hereafter, an overall maximum power amount corresponding to high-priority is written as Wm (H), a group n's maximum power amount as Wmn (H), an overall maximum power amount corresponding to low-priority as Wm (L), and a group n's maximum power amount as Wmn (L). It is assumed here that the relationship between these maximum power amounts satisfies the inequalities Wm (H)>Wm (L), and Wmn (H)>Wmn (L).

The following describes the operation contents of the power amount maximum judgment process relating to the present modification example, with reference to a flowchart shown in FIG. 15. First, the overall maximum power amount corresponding to a priority level of a new job (Wm (H) or Wm (L)) and the overall consumption power amount Wc are compared. When the overall consumption power amount Wc is equal to or greater than the maximum power amount ("No" in step S70), a message "NG" is returned to the copy process routine that is the upper routine (step S73), and the processing returns to the copy process routine (FIG. 12).

On the other hand, in the case of "OK" ("Yes" in step S70), the processing advances to step S71, where the group's maximum power amount corresponding to a priority level of a new job (Wmn (H) or Wmn(L)) is compared with the group's consumption power amount Wcn. When the consumption power amount Wcn is equal to or greater than the maximum power amount ("No" in step S71), a message "NG" is returned (step S73), and the processing returns to the copy process routine (FIG. 12). On the other hand, in the case of "OK", a message "OK" is returned (step S72), and the processing returns to the copy process routine (FIG. 12).

With the processing described above, such a case where the allocated power amount is used up to the maximum for execution of jobs with low-priority can be avoided. Therefore, a power amount can be secured for jobs with high-priority.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is

1. An image forming apparatus that forms images by executing jobs submitted by users who belong to groups, comprising:
   a cumulating unit for cumulating, for each group, power amounts that have been consumed for executing jobs; and
   a restricting unit for restricting, when a cumulated consumption power amount for any of the groups exceeds a power amount allocated to the group, job execution by the group by i) prohibiting execution of a job that is newly submitted by the group after the cumulated consumption power amount for the group exceeds the allocated power amount, and ii) permitting a job that is currently being executed to be completed, even if the cumulated consumption power amount for the group exceeds the allocated power amount.

2. The image forming apparatus of claim 1, wherein the cumulating unit
   (a) resets the cumulated consumption power amount for each group in a predetermined time cycle, and
   (b) when a cumulated consumption power amount for any of the groups exceeded a power amount allocated to the group at an end a previous cycle, adds an excess power amount by which the cumulated consumption power amount exceeded the allocated power amount to a reset consumption power amount for the group.

3. The image forming apparatus of claim 1, wherein the cumulating unit further cumulates idle-state power amounts consumed while execution of a job is not being performed.

4. The image forming apparatus of claim 3, wherein the cumulating unit divides the cumulated idle-state consumption power amount equally for each group, and adds a divided consumption power amount to the cumulated consumption power amount for each group.

5. An image forming apparatus that forms images by executing jobs submitted by users who belong to groups, the image forming apparatus being connected to one or more homogeneous image forming apparatuses via a network, the image forming apparatus comprising:
   a cumulating unit for cumulating, for each group, power amounts that have been consumed in the image forming apparatus for executing jobs;
   a transmitting unit for transmitting a cumulated consumption power amount for each group to the one or more image forming apparatuses;
   a receiving unit for receiving a cumulated consumption power amount for each group transmitted from the one or more image forming apparatuses;
   a summing unit for summing up, for each group, power amounts that have been consumed in all the image forming apparatuses connected via the network for executing jobs, using the cumulated consumption power amount for each group obtained by the cumulating unit and the cumulated consumption power amount for each group received by the receiving unit; and
   a restricting unit for restricting, when a summed consumption power amount for any of the groups obtained by the summing unit exceeds a power amount allocated to the group, job execution by the group.

6. The image forming apparatus of claim 5, wherein the restricting unit prohibits execution of a job that is newly submitted by the group after the summed consumption power amount for the group obtained by the summing unit exceeds the allocated power amount.

7. The image forming apparatus of claim 6, wherein the restricting unit permits execution of a job that is currently being executed to be completed, even if the summed consumption power amount for the group obtained by the summing unit exceeds the allocated power amount, and
the cumulating unit resets the cumulated consumption power amount in a predetermined time cycle or the summing unit resets the summed consumption power amount in a predetermined time cycle, and
the summing unit adds, when a summed consumption power amount for any of the groups exceeded a power amount allocated to the group at an end of a previous cycle, an excess power amount by which the summed consumption power amount exceeded the allocated power amount to a reset consumption power amount for the group.

8. The image forming apparatus of claim 5, wherein the cumulating unit further cumulates idle-state power amounts consumed while execution of a job is not being performed.

9. The image forming apparatus of claim 8,
wherein the cumulating unit divides the cumulated idle-state consumption power amount equally for each group, and adds a divided consumption power amount to the cumulated consumption power amount for each group.

10. A power consumption restriction system comprising one or more image forming apparatuses and a restricting apparatus that is connected in a communicable state to the one or more image forming apparatuses and that restricts power consumption of the one or more image forming apparatuses,
wherein each of the one or more image forming apparatuses forms images by executing jobs submitted by users who belong to groups, and includes:
a cumulating unit for cumulating, for each group, power amounts that have been consumed in the image forming apparatus for executing jobs; and
a transmitting unit for transmitting a cumulated consumption power amount for each group to the restricting apparatus, and
the restriction unit includes:
a receiving unit for receiving the cumulated consumption power amount for each group transmitted from the one or more image forming apparatuses;
a summing unit for summing up, for each group, power amounts that have been consumed in the one or more image forming apparatuses connected via the network for executing jobs, using the cumulated consumption power amount for each group received by the receiving unit;
an obtaining unit for obtaining a power amount allocated to each group; and
a restricting unit for restricting, when a summed consumption power amount for any of the groups obtained by the summing unit exceeds a power amount allocated to the group, job execution by the group.

11. The power consumption restriction system of claim 10,
wherein the restricting apparatus is attached to one of the one or more image forming apparatuses.

12. The power consumption restriction system of claim 10,
wherein the restricting apparatus is a personal computer.

13. A computer readable medium encoded with a power consumption restriction program that is executed by an image forming apparatus that forms images by executing jobs submitted by users who belong to groups, the power consumption restriction program comprising:
a cumulating step of cumulating, for each group, power amounts that have been consumed for executing jobs;
an obtaining step of obtaining a power amount allocated to each group; and
a restricting step of restricting, when a cumulated consumption power amount for any of the groups exceeds a power amount allocated to the group, job execution by the group by i) prohibiting execution of a job that is newly submitted by the group after the cumulated consumption power amount for the group exceeds the allocated power amount, and ii) permitting a job that is currently being executed to be completed, even if the cumulated consumption power amount for the group exceeds the allocated power amount.

14. A computer readable medium encoded with a power consumption restriction program that is executed by an image forming apparatus that forms images by executing jobs submitted by users who belong to groups, and that is connected to one or more image forming apparatuses via a network, the power consumption restriction program comprising:
a cumulating step of cumulating, for each group, power amounts that have been consumed in the image forming apparatus for executing jobs;
a transmitting step of transmitting a cumulated consumption power amount for each group obtained in the cumulating step, to the one or more image forming apparatuses;
a receiving step of receiving a cumulated consumption power amount for each group transmitted from the one or more image forming apparatuses;
a summing step of summing up, for each group, power amounts that have been consumed in all the image forming apparatuses connected via the network for executing jobs, using the cumulated consumption power for each group obtained in the cumulating step and the cumulated consumption power amount for each group received in the receiving step;
an obtaining step of obtaining a power amount allocated to each group; and
a restricting step of restricting, when a summed consumption power amount for any of the groups obtained in the summing step exceeds a power amount allocated to the group, job execution by the group.

15. A power consumption restriction method that is executed by an image forming apparatus that forms images by executing jobs submitted by users who belong to groups, the power consumption restriction method comprising:
a cumulating step of cumulating, for each group, power amounts that have been consumed for executing jobs;
an obtaining step of obtaining a power amount allocated to each group; and
a restricting step of restricting, when a cumulated consumption power amount for any of the groups exceeds a power amount allocated to the group, job execution by the group by i) prohibiting execution of a job that is newly submitted by the group after the cumulated consumption power amount for the group exceeds the allocated power amount, and ii) permitting a job that is currently being executed to be completed, even if the cumulated consumption power amount for the group exceeds the allocated power amount.

16. A power consumption restriction method that is executed by an image forming apparatus that forms images by executing jobs submitted by users who belong to groups, and that is connected to one or more image forming apparatuses via a network, the power consumption restriction method comprising:
a cumulating step of cumulating, for each group, power amounts that have been consumed in the image forming apparatus for executing jobs;
a transmitting step of transmitting a cumulated consumption power amount for each group obtained in the cumulating step, to the one or more image forming apparatuses;
a receiving step of receiving a cumulated consumption power amount for each group transmitted from the one or more image forming apparatuses;
a summing step of summing up, for each group, power amounts that have been consumed in all the image forming apparatuses connected via the network for executing jobs, using the cumulated consumption power amount for each group obtained in the cumulating step and the cumulated consumption power amount for each group received in the receiving step;

an obtaining step of obtaining a power amount allocated to each group; and a restricting step of restricting, when a summed consumption power amount for any of the groups obtained in the summing step exceeds a power amount allocated to the group, job execution by the group.

* * * * *